(12) United States Patent
Kishimoto et al.

(10) Patent No.: US 11,014,074 B2
(45) Date of Patent: May 25, 2021

(54) CELL ELECTRODE, COMPOSITION FOR CELL ELECTRODE CATALYST LAYER, AND CELL

(71) Applicant: NISSHINBO HOLDINGS INC., Tokyo (JP)

(72) Inventors: Takeaki Kishimoto, Funabashi (JP); Chihiro Fujii, Chiba (JP); Miki Nakayama, Funabashi (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 116 days.

(21) Appl. No.: 16/099,419

(22) PCT Filed: Apr. 13, 2017

(86) PCT No.: PCT/JP2017/015162
§ 371 (c)(1),
(2) Date: Nov. 6, 2018

(87) PCT Pub. No.: WO2017/199653
PCT Pub. Date: Nov. 23, 2017

(65) Prior Publication Data
US 2019/0143308 A1  May 16, 2019

(30) Foreign Application Priority Data
May 17, 2016  (JP) .............................. JP2016-099056

(51) Int. Cl.
*H01M 4/92* (2006.01)
*H01M 8/1004* (2016.01)
*B01J 23/89* (2006.01)
*B01J 27/24* (2006.01)
*H01M 4/90* (2006.01)
*H01M 8/10* (2016.01)

(52) U.S. Cl.
CPC ........... *B01J 23/8906* (2013.01); *B01J 23/89* (2013.01); *B01J 27/24* (2013.01); *H01M 4/90* (2013.01); *H01M 4/92* (2013.01); *H01M 4/926* (2013.01); *H01M 8/1004* (2013.01); *B01J 23/8913* (2013.01); *B01J 23/8926* (2013.01); *H01M 8/10* (2013.01)

(58) Field of Classification Search
CPC ........ B01J 23/8906; B01J 23/89; B01J 27/24; B01J 23/8913; B01J 23/8926; H01M 4/92; H01M 4/90; H01M 4/926; H01M 8/1004; H01M 8/10; H01M 4/9041; H01M 4/96; H01M 4/8668; H01M 2008/1095; H01M 4/923; H01M 4/921
See application file for complete search history.

(56) References Cited

U.S. PATENT DOCUMENTS

| | | | | |
|---|---|---|---|---|
| 4,855,123 | A * | 8/1989 | Suzuki ..................... | B01J 21/18 423/562 |
| 2003/0091891 | A1 | 5/2003 | Yoshida et al. | |
| 2009/0162721 | A1* | 6/2009 | Naohara ............. | H01M 4/8828 429/444 |
| 2010/0028755 | A1 | 2/2010 | Shiramizu | |
| 2012/0055334 | A1* | 3/2012 | Ogata .................. | B01D 53/323 95/135 |
| 2012/0220446 | A1* | 8/2012 | Kishimoto .......... | H01M 4/9083 502/1 |
| 2013/0288888 | A1* | 10/2013 | Miyata .................... | H01M 4/90 502/174 |
| 2013/0330652 | A1* | 12/2013 | Suchsland ............. | H01M 4/925 429/482 |
| 2014/0011672 | A1 | 1/2014 | Kishimoto et al. | |
| 2017/0194653 | A1 | 7/2017 | Imashiro et al. | |

FOREIGN PATENT DOCUMENTS

| | | |
|---|---|---|
| JP | 2007-207662 A | 8/2007 |
| JP | 2014-505330 A | 2/2014 |
| WO | 2007/119132 A1 | 10/2007 |
| WO | 2011/055739 A1 | 5/2011 |
| WO | 2016/088716 A1 | 6/2016 |

OTHER PUBLICATIONS

Jan. 3, 2020 Extended Search Report issued in European Patent Application No. 17799085.0.
Chenitz et al., "Influence of H2- or Co-Phthalocyanine Impregnation of Pt/C and Pd/C Catalysts on Formic Acid Electra-Oxidation," ECS Transactions, 2009, vol. 25, No. 1, pp. 1395-1405.
"Zukai Nenryo Denchi Gijutsu Honkaku Fukyu no tameno Zairyo*Oyo*Infra Kaihatsu," 1st Edition, The Nikkan Kogyo Shinbun, Ltd., 2014, ISBN 978-4-526-07320-5, pp. 42-43.
May 16, 2017 International Search Report issued in International Patent Application No. PCT/JP2017/015162.

* cited by examiner

*Primary Examiner* — Muhammad S Siddiquee
(74) *Attorney, Agent, or Firm* — Oliff PLC

(57) ABSTRACT

A battery electrode, a composition for a catalyst layer of a battery electrode, and a battery having excellent characteristics at low cost. The battery electrode includes a catalyst layer containing a non-platinum catalyst and platinum particles not being carried on the non-platinum catalyst, wherein a content of the platinum particles per unit area of the battery electrode is 0.0010 mg/cm$^2$ or more and 0.1200 mg/cm$^2$ or less.

19 Claims, 7 Drawing Sheets

FIG.1A

| | CARBON CATALYST | | | | | | Pt/CARRIER | | |
|---|---|---|---|---|---|---|---|---|---|
| | SAMPLE | XRD (PEAK SEPARATION) | | | XPS | TPD | | | |
| | | $f_{broad}$ (%) | $f_{middle}$ (%) | $f_{narrow}$ (%) | N/C (−) | CO (mmol/g) | $CO_2$ (mmol/g) | Pt/ (Pt/CARRIER) (wt%) | Pt-ECA ($m^2/g$) | AVERAGE PARTICLE DIAMETER OF Pt (nm) |
| EXAMPLE C1 | KB | 96.7 | 3.2 | 0.1 | − | 0.150 | 0.013 | 20 | 56.2 | 9.2 |
| EXAMPLE C2 | CA-Ia | 80.7 | 9.7 | 9.6 | 0.017 | 0.480 | 0.130 | − | − | − |
| EXAMPLE C3 | CA-Ia | 80.7 | 9.7 | 9.6 | 0.017 | 0.480 | 0.130 | − | − | − |
| EXAMPLE C4 | CA-Ia | 80.7 | 9.7 | 9.6 | 0.017 | 0.480 | 0.130 | 20 | 56.2 | 9.2 |
| EXAMPLE C5 | CA-Ia | 80.7 | 9.7 | 9.6 | 0.017 | 0.480 | 0.130 | 20 | 56.2 | 9.2 |
| EXAMPLE 1 | CA-Ia | 80.7 | 9.7 | 9.6 | 0.017 | 0.480 | 0.130 | 20 | 56.2 | 9.2 |
| EXAMPLE 2 | CA-Ia | 80.7 | 9.7 | 9.6 | 0.017 | 0.480 | 0.130 | 20 | 56.2 | 9.2 |
| EXAMPLE 3 | CA-Ia | 80.7 | 9.7 | 9.6 | 0.017 | 0.480 | 0.130 | 20 | 56.2 | 9.2 |
| EXAMPLE 4 | CA-Ia | 80.7 | 9.7 | 9.6 | 0.017 | 0.480 | 0.130 | 20 | 56.2 | 9.2 |
| EXAMPLE 5 | CA-Ia | 80.7 | 9.7 | 9.6 | 0.017 | 0.480 | 0.130 | 20 | 56.2 | 9.2 |
| EXAMPLE 6 | CA-Ia | 80.7 | 9.7 | 9.6 | 0.017 | 0.480 | 0.130 | 20 | 56.2 | 9.2 |
| EXAMPLE 7 | CA-Ia | 80.7 | 9.7 | 9.6 | 0.017 | 0.480 | 0.130 | 20 | 56.2 | 9.2 |
| EXAMPLE 8 | CA-Ia | 80.7 | 9.7 | 9.6 | 0.017 | 0.480 | 0.130 | 20 | 56.2 | 9.2 |
| EXAMPLE 9 | CA-Ia | 80.7 | 9.7 | 9.6 | 0.017 | 0.480 | 0.130 | 20 | 56.2 | 9.2 |
| EXAMPLE 10 | CA-Ia | 80.7 | 9.7 | 9.6 | 0.017 | 0.480 | 0.130 | 20 | 56.2 | 9.2 |
| EXAMPLE 11 | CA-IIa | 77.8 | 14.7 | 7.5 | 0.010 | 0.350 | 0.110 | 20 | 56.2 | 9.2 |
| EXAMPLE 12 | CA-IIb | 76.2 | 14.9 | 8.9 | 0.013 | 0.340 | 0.110 | 20 | 56.2 | 9.2 |
| EXAMPLE 13 | CA-Ib | 94.9 | 4.0 | 1.1 | 0.021 | 0.690 | 0.150 | 20 | 56.2 | 9.2 |
| EXAMPLE 14 | CA-Ic | 78.4 | 11.9 | 9.7 | 0.015 | 0.510 | 0.120 | 20 | 56.2 | 9.2 |
| EXAMPLE 15 | CA-Id | 78.6 | 11.8 | 9.6 | 0.012 | 0.600 | 0.130 | 20 | 56.2 | 9.2 |
| EXAMPLE 16 | CA-Ia | 80.7 | 9.7 | 9.6 | 0.017 | 0.480 | 0.130 | 20 | 56.2 | 9.2 |
| EXAMPLE 17 | CA-Ia | 80.7 | 9.7 | 9.6 | 0.017 | 0.480 | 0.130 | 20 | 56.2 | 9.2 |
| EXAMPLE 18 | CA-Ia | 80.7 | 9.7 | 9.6 | 0.017 | 0.480 | 0.130 | 20 | 56.2 | 9.2 |
| EXAMPLE 19 | CA-Ia | 80.7 | 9.7 | 9.6 | 0.017 | 0.480 | 0.130 | 20 | 56.2 | 9.2 |
| EXAMPLE 20 | CA-Ia | 80.7 | 9.7 | 9.6 | 0.017 | 0.480 | 0.130 | 40 | 68.6 | 4.5 |
| EXAMPLE 21 | CA-Ia | 80.7 | 9.7 | 9.6 | 0.017 | 0.480 | 0.130 | 40 | 81.7 | 2.0 |
| EXAMPLE 22 | CA-Ia | 80.7 | 9.7 | 9.6 | 0.017 | 0.480 | 0.130 | 20 | 103.3 | 1.9 |
| EXAMPLE 23 | CA-Ia | 80.7 | 9.7 | 9.6 | 0.017 | 0.480 | 0.130 | 20 | 56.2 | 9.2 |
| EXAMPLE 24 | CA-IIa | 77.8 | 14.7 | 7.5 | 0.010 | 0.350 | 0.110 | 20 | 56.2 | 9.2 |
| EXAMPLE 25 | CA-IIb | 76.2 | 14.9 | 8.9 | 0.013 | 0.340 | 0.110 | 20 | 56.2 | 9.2 |
| EXAMPLE 26 | CA-Ib | 94.9 | 4.0 | 1.1 | 0.021 | 0.690 | 0.150 | 20 | 56.2 | 9.2 |
| EXAMPLE 27 | CA-Ic | 78.4 | 11.9 | 9.7 | 0.015 | 0.510 | 0.120 | 20 | 56.2 | 9.2 |
| EXAMPLE 28 | CA-Id | 78.6 | 11.8 | 9.6 | 0.012 | 0.600 | 0.130 | 20 | 56.2 | 9.2 |
| EXAMPLE 29 | CA-Ia | 80.7 | 9.7 | 9.6 | 0.017 | 0.480 | 0.130 | 20 | 25.7 | 15.0 |
| EXAMPLE 30 | CA-Ia | 80.7 | 9.7 | 9.6 | 0.017 | 0.480 | 0.130 | 20 | 16.0 | 17.5 |
| EXAMPLE 31 | CA-Ia | 80.7 | 9.7 | 9.6 | 0.017 | 0.480 | 0.130 | 20 | 11.2 | 25.0 |
| EXAMPLE 32 | CA-Ia | 80.7 | 9.7 | 9.6 | 0.017 | 0.480 | 0.130 | 20 | 10.2 | 27.3 |
| EXAMPLE 33 | CA-Ia | 80.7 | 9.7 | 9.6 | 0.017 | 0.480 | 0.130 | 20 | 9.5 | 29.4 |
| EXAMPLE 34 | CA-III | 64.4 | 30.3 | 5.3 | 0.005 | 0.270 | 0.060 | 20 | 56.2 | 9.2 |
| EXAMPLE 35 | CA-IV | 63.6 | 22.4 | 14.0 | 0.009 | 0.290 | 0.090 | 20 | 56.2 | 9.2 |
| EXAMPLE 36 | CA-Ia | 80.7 | 9.7 | 9.6 | 0.017 | 0.480 | 0.130 | 20 | 56.2 | 9.2 |
| EXAMPLE 37 | CA-Ia | 80.7 | 9.7 | 9.6 | 0.017 | 0.480 | 0.130 | 20 | 56.2 | 9.2 |
| EXAMPLE 38 | CA-Ia | 80.7 | 9.7 | 9.6 | 0.017 | 0.480 | 0.130 | 20 | 56.2 | 9.2 |
| EXAMPLE 39 | CA-Ia | 80.7 | 9.7 | 9.6 | 0.017 | 0.480 | 0.130 | 20 | 56.2 | 9.2 |
| EXAMPLE C6 | CA-Ia | 80.7 | 9.7 | 9.6 | 0.017 | 0.480 | 0.130 | 20 | 56.2 | 9.2 |
| EXAMPLE C7 | CA-Ia | 80.7 | 9.7 | 9.6 | 0.017 | 0.480 | 0.130 | 20 | 56.2 | 9.2 |
| EXAMPLE C8 | CA-IV | 63.6 | 22.4 | 14.0 | 0.009 | 0.290 | 0.090 | 2 | 81.1 | 10.0 |
| EXAMPLE C9 | CA-Ia | 80.7 | 9.7 | 9.6 | 0.017 | 0.480 | 0.130 | 2 | 25.7 | 10.0 |
| EXAMPLE C10 | CA-III | 64.4 | 30.3 | 5.3 | 0.005 | 0.270 | 0.060 | 2 | 27.4 | 10.0 |

FIG.1B

| | COMPOSITION FOR CATALYST LAYER OF BATTERY ELECTRODE | | | BATTERY ELECTRODE | | | | | | |
|---|---|---|---|---|---|---|---|---|---|---|
| | ICP | TPD | | CONTENT PER UNIT AREA OF ELECTRODE | | | CONDI-TION OF CATA-LYST LAYER | DURABILITY TEST | | |
| | Pt/(METAL OTHER THAN Pt) | CO | $CO_2$ | Pt | Pt/CARRIER | CARBON CATALYST | | VOLTAGE AT 0.2 A/$cm^2$ (mV) | | |
| | (–) | (mmol/g) | (mmol/g) | (mg/$cm^2$) | (mg/$cm^2$) | (mg/$cm^2$) | | BEFORE TEST | AFTER TEST | DIFFE-RENCE |
| EXAMPLE C1 | – | 0.085 | 0.008 | 0.0200 | 0.1000 | 1.0 | ○ | 660 | 461 | 199 |
| EXAMPLE C2 | – | 0.282 | 0.076 | 0.0000 | – | 2.5 | ○ | 742 | 624 | 118 |
| EXAMPLE C3 | – | 0.282 | 0.076 | 0.0000 | – | 1.0 | ○ | 738 | 610 | 128 |
| EXAMPLE C4 | 0.03 | 0.282 | 0.076 | 0.0003 | 0.0013 | 1.0 | ○ | 738 | 615 | 123 |
| EXAMPLE C5 | 0.03 | 0.282 | 0.076 | 0.0006 | 0.0031 | 2.5 | ○ | 742 | 632 | 110 |
| EXAMPLE 1 | 0.17 | 0.282 | 0.076 | 0.0010 | 0.0050 | 1.0 | ○ | 738 | 712 | 26 |
| EXAMPLE 2 | 0.08 | 0.282 | 0.076 | 0.0013 | 0.0063 | 2.5 | ○ | 742 | 712 | 30 |
| EXAMPLE 3 | 0.17 | 0.282 | 0.076 | 0.0025 | 0.0125 | 2.5 | ○ | 743 | 719 | 24 |
| EXAMPLE 4 | 0.42 | 0.280 | 0.076 | 0.0025 | 0.0125 | 1.0 | ○ | 738 | 716 | 22 |
| EXAMPLE 5 | 0.34 | 0.281 | 0.076 | 0.0050 | 0.0250 | 2.5 | ○ | 746 | 721 | 25 |
| EXAMPLE 6 | 0.83 | 0.279 | 0.075 | 0.0050 | 0.0250 | 1.0 | ○ | 739 | 716 | 23 |
| EXAMPLE 7 | 0.42 | 0.280 | 0.076 | 0.0063 | 0.0313 | 2.5 | ○ | 744 | 723 | 21 |
| EXAMPLE 8 | 0.66 | 0.279 | 0.076 | 0.0100 | 0.0500 | 2.5 | ○ | 749 | 726 | 23 |
| EXAMPLE 9 | 1.66 | 0.275 | 0.075 | 0.0100 | 0.0500 | 1.0 | ○ | 740 | 715 | 25 |
| EXAMPLE 10 | 1.66 | 0.268 | 0.073 | 0.0200 | 0.1000 | 1.0 | ○ | 748 | 725 | 23 |
| EXAMPLE 11 | 2.89 | 0.196 | 0.062 | 0.0200 | 0.1000 | 1.0 | ○ | 695 | 658 | 37 |
| EXAMPLE 12 | 2.89 | 0.190 | 0.062 | 0.0200 | 0.1000 | 1.0 | ○ | 688 | 647 | 41 |
| EXAMPLE 13 | 0.67 | 0.385 | 0.084 | 0.0200 | 0.1000 | 1.0 | ○ | 732 | 704 | 28 |
| EXAMPLE 14 | 1.22 | 0.285 | 0.067 | 0.0200 | 0.1000 | 1.0 | ○ | 725 | 697 | 28 |
| EXAMPLE 15 | 1.15 | 0.335 | 0.073 | 0.0200 | 0.1000 | 1.0 | ○ | 723 | 694 | 29 |
| EXAMPLE 16 | 1.66 | 0.275 | 0.075 | 0.0250 | 0.1250 | 2.5 | ○ | 760 | 735 | 25 |
| EXAMPLE 17 | 1.98 | 0.274 | 0.074 | 0.0300 | 0.1500 | 2.5 | ○ | 764 | 740 | 24 |
| EXAMPLE 18 | 6.64 | 0.255 | 0.069 | 0.0400 | 0.2000 | 1.0 | ○ | 771 | 743 | 28 |
| EXAMPLE 19 | 3.30 | 0.268 | 0.073 | 0.0500 | 0.2500 | 2.5 | ○ | 778 | 753 | 25 |
| EXAMPLE 20 | 3.32 | 0.275 | 0.074 | 0.0500 | 0.1250 | 2.5 | ○ | 774 | 745 | 29 |
| EXAMPLE 21 | 3.32 | 0.275 | 0.074 | 0.0500 | 0.1250 | 2.5 | ○ | 769 | 738 | 30 |
| EXAMPLE 22 | 3.30 | 0.269 | 0.073 | 0.0500 | 0.2500 | 2.5 | ○ | 766 | 736 | 30 |
| EXAMPLE 23 | 8.31 | 0.249 | 0.068 | 0.0500 | 0.2500 | 1.0 | ○ | 739 | 711 | 28 |
| EXAMPLE 24 | 2.89 | 0.196 | 0.062 | 0.0500 | 0.2500 | 2.5 | ○ | 704 | 665 | 39 |
| EXAMPLE 25 | 2.89 | 0.190 | 0.062 | 0.0500 | 0.2500 | 2.5 | ○ | 693 | 653 | 40 |
| EXAMPLE 26 | 0.67 | 0.385 | 0.084 | 0.0500 | 0.2500 | 2.5 | ○ | 734 | 708 | 26 |
| EXAMPLE 27 | 1.22 | 0.285 | 0.067 | 0.0500 | 0.2500 | 2.5 | ○ | 728 | 698 | 30 |
| EXAMPLE 28 | 1.15 | 0.335 | 0.073 | 0.0500 | 0.2500 | 2.5 | ○ | 725 | 697 | 28 |
| EXAMPLE 29 | 3.30 | 0.268 | 0.073 | 0.0500 | 0.2500 | 2.5 | ○ | 752 | 675 | 77 |
| EXAMPLE 30 | 3.30 | 0.268 | 0.073 | 0.0500 | 0.2500 | 2.5 | ○ | 749 | 666 | 83 |
| EXAMPLE 31 | 3.30 | 0.268 | 0.073 | 0.0500 | 0.2500 | 2.5 | ○ | 746 | 659 | 87 |
| EXAMPLE 32 | 3.30 | 0.268 | 0.073 | 0.0500 | 0.2500 | 2.5 | ○ | 742 | 650 | 92 |
| EXAMPLE 33 | 3.30 | 0.268 | 0.073 | 0.0500 | 0.2500 | 2.5 | ○ | 742 | 649 | 93 |
| EXAMPLE 34 | 2.89 | 0.151 | 0.034 | 0.0500 | 0.2500 | 2.5 | ○ | 580 | 511 | 69 |
| EXAMPLE 35 | 3.31 | 0.162 | 0.050 | 0.0500 | 0.2500 | 2.5 | ○ | 565 | 495 | 70 |
| EXAMPLE 36 | 10.01 | 0.243 | 0.066 | 0.0600 | 0.3000 | 1.0 | △ | 770 | 740 | 30 |
| EXAMPLE 37 | 5.29 | 0.260 | 0.071 | 0.0800 | 0.4000 | 2.5 | △ | 772 | 752 | 20 |
| EXAMPLE 38 | 6.64 | 0.255 | 0.069 | 0.1000 | 0.5000 | 2.5 | △ | 780 | 760 | 20 |
| EXAMPLE 39 | 19.67 | 0.215 | 0.059 | 0.1200 | 0.6000 | 1.0 | △ | 769 | 738 | 31 |
| EXAMPLE C6 | 10.01 | 0.243 | 0.066 | 0.1500 | 0.7500 | 2.5 | × | 778 | 748 | 30 |
| EXAMPLE C7 | 19.67 | 0.215 | 0.059 | 0.3000 | 1.5000 | 2.5 | × | 776 | 745 | 31 |
| EXAMPLE C8 | 3.33 | 0.118 | 0.053 | 0.0500 | 2.5000 | 2.45 | ○ | 555 | 458 | 97 |
| EXAMPLE C9 | 3.32 | 0.277 | 0.076 | 0.0500 | 2.5000 | 2.45 | ○ | 742 | 646 | 96 |
| EXAMPLE C10 | 2.87 | 0.159 | 0.035 | 0.0500 | 2.5000 | 2.45 | ○ | 570 | 472 | 98 |

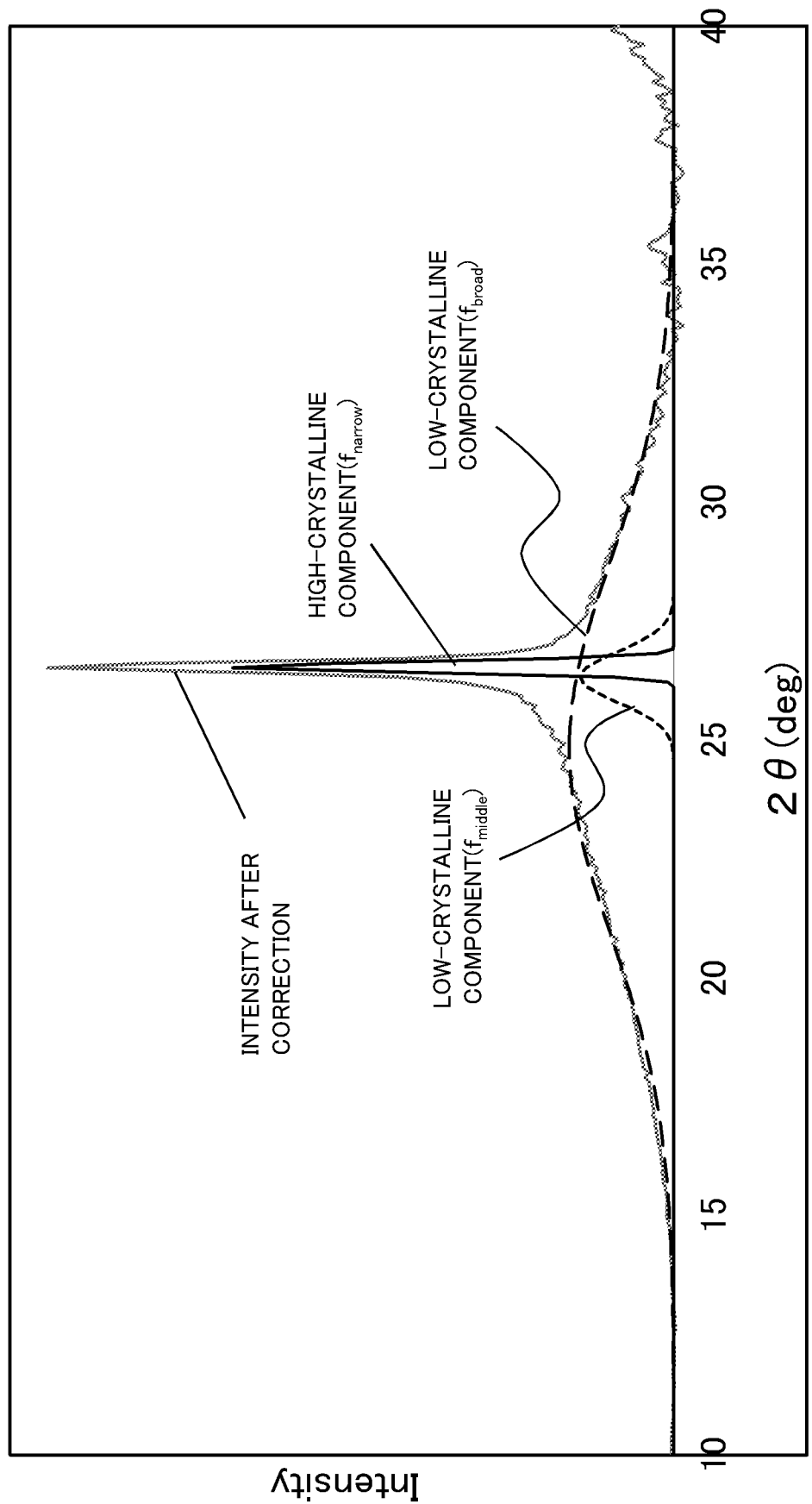

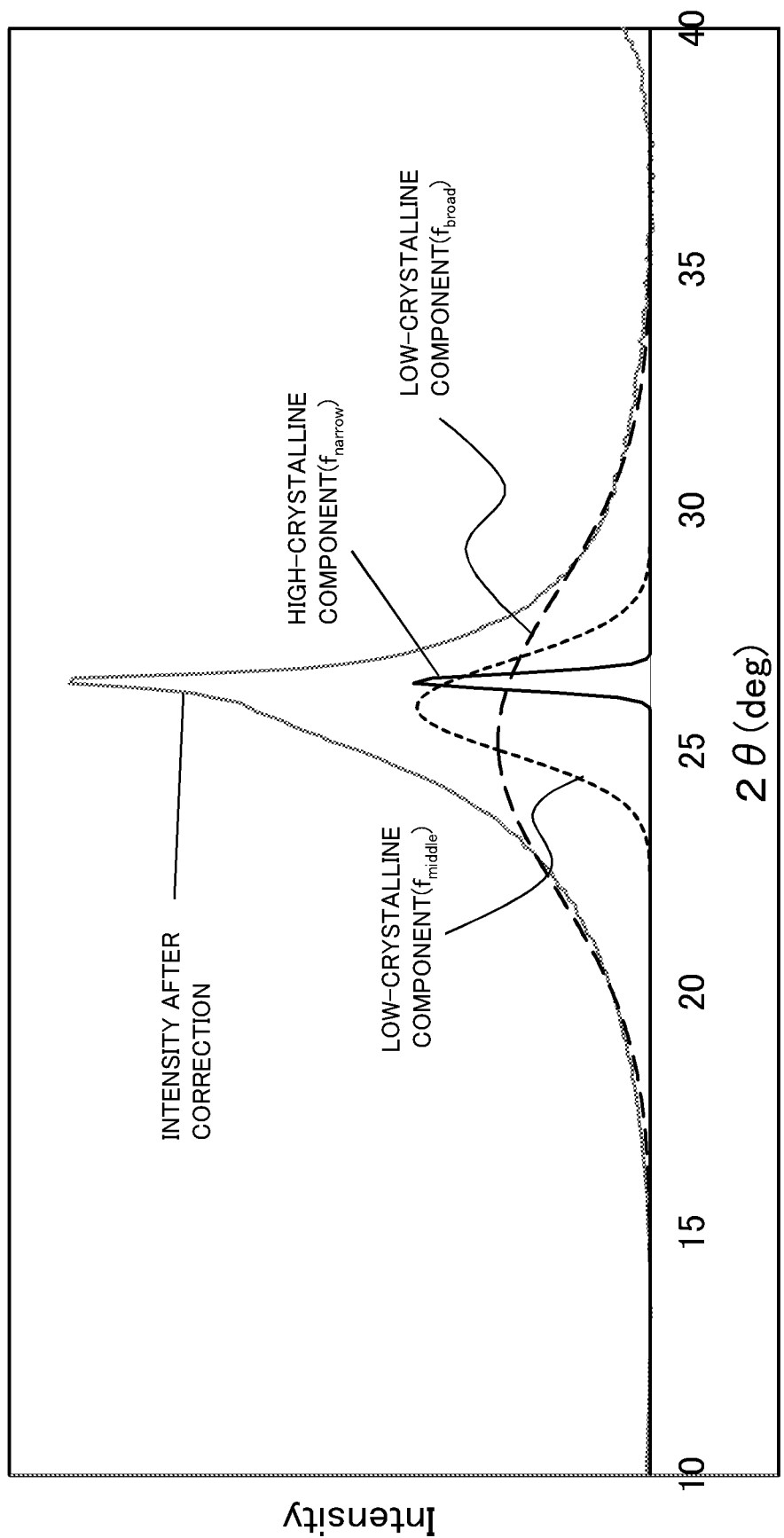

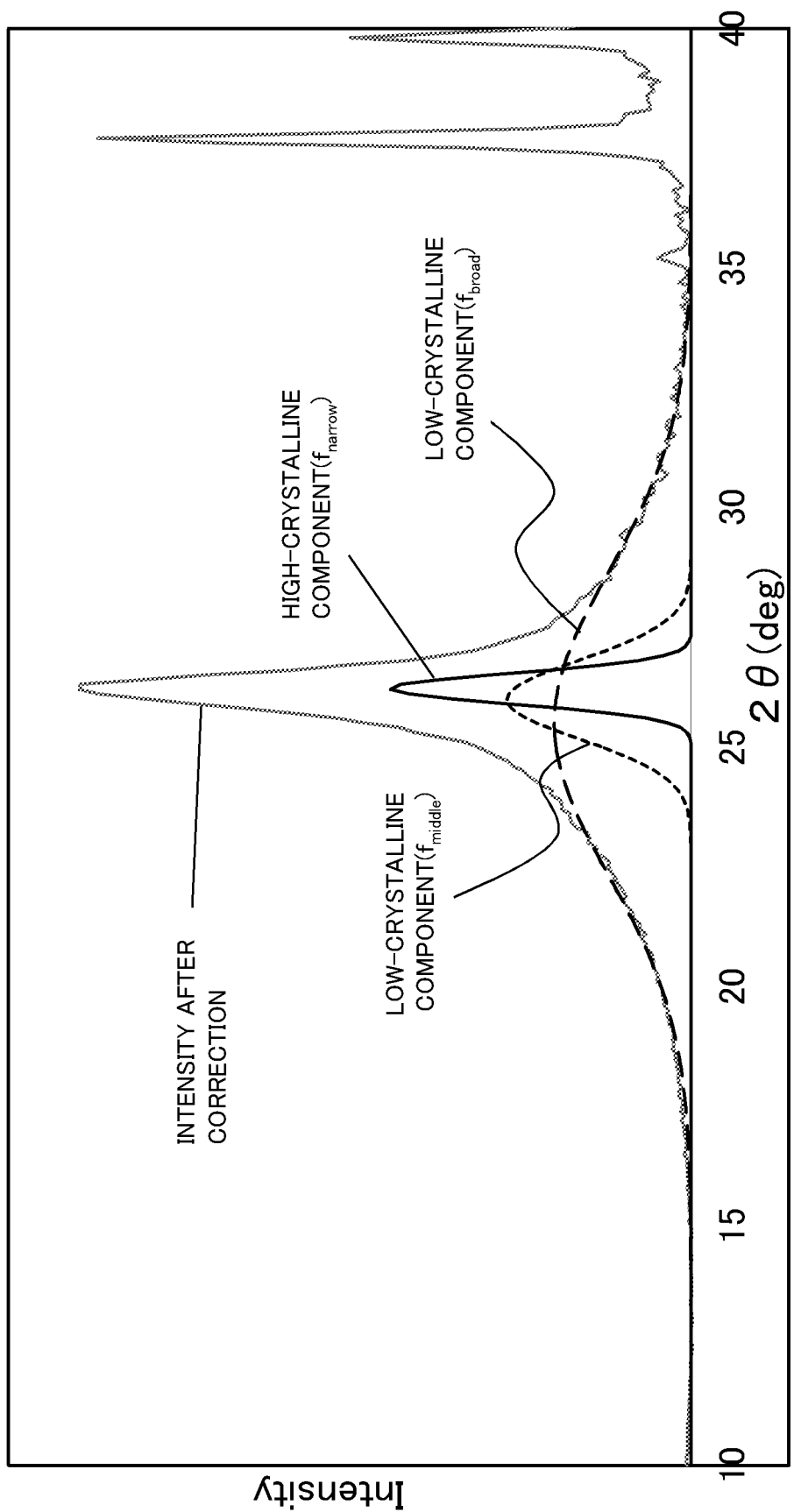

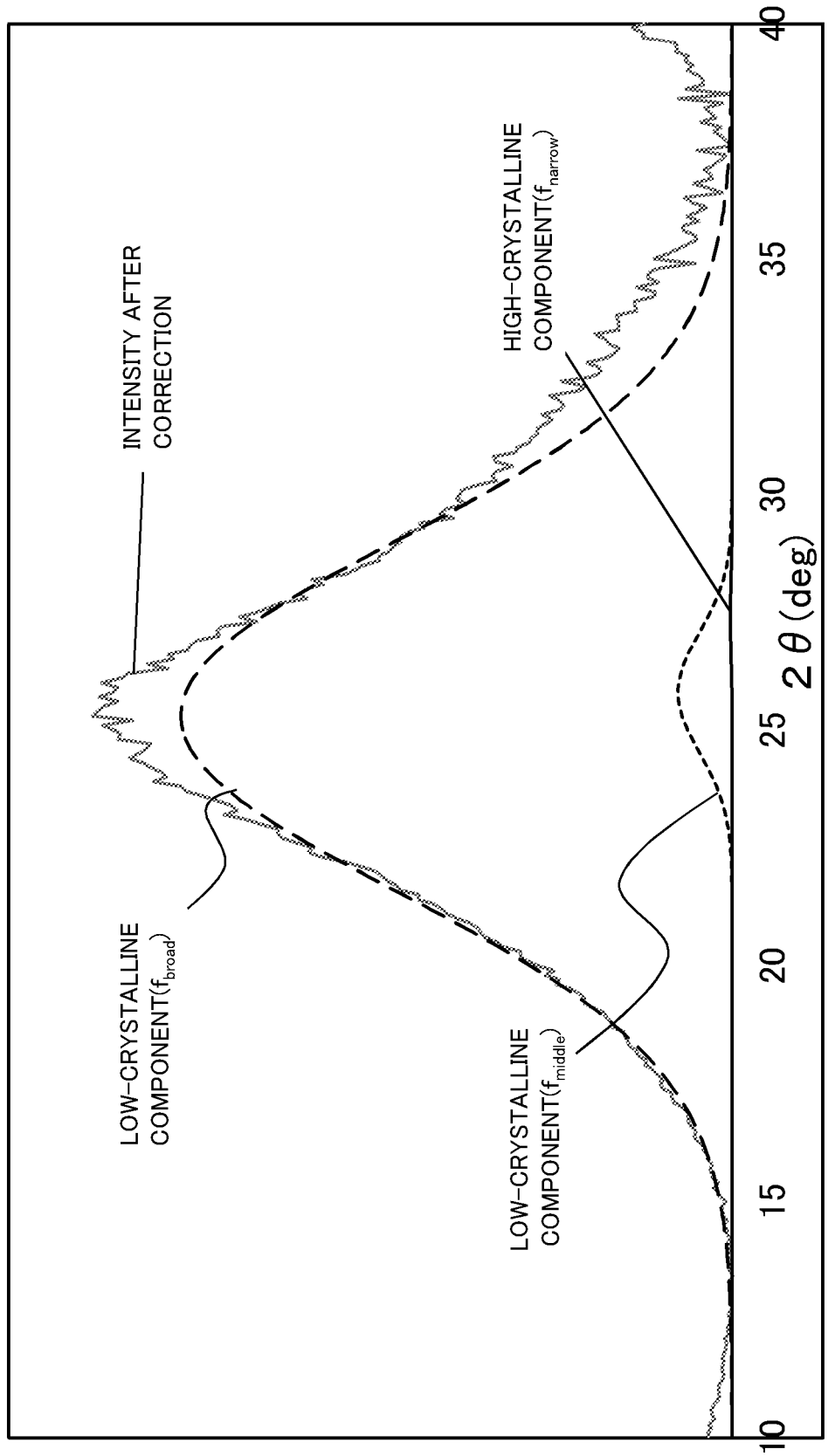

CELL ELECTRODE, COMPOSITION FOR CELL ELECTRODE CATALYST LAYER, AND CELL

TECHNICAL FIELD

The present invention relates to a battery electrode, a composition for a catalyst layer of a battery electrode, and a battery.

BACKGROUND ART

Currently, a platinum catalyst is used for an electrode of a fuel cell. However, there are many problems to be solved. For example, reserves of platinum are limited. In a polymer electrolyte fuel cell (PEFC), the use of platinum increases cost. In an air cell, the use of platinum increases cost, and in addition, platinum causes a chemical reaction, such as decomposition of an electrolyte solution.

Therefore, an alternative technology which does not use platinum has been developed. Specifically, for example, Patent Literature 1 discloses an electrode catalyst for a fuel cell formed of a carbonized material having a shell-like structure.

CITATION LIST

Patent Literature

[Patent Literature 1] JP 2007-207662 A

SUMMARY OF INVENTION

Technical Problem

However, it has hitherto been difficult to achieve a battery electrode having excellent characteristics at low cost.

The present invention has been made in view of the above-mentioned problem, and one of the objects of the present invention is to provide a battery electrode, a composition for a catalyst layer of such battery electrode, and a battery, each having excellent characteristics at low cost.

Solution to Problem

A battery electrode according to one embodiment of the present invention, for achieving the object, is a battery electrode, including a catalyst layer containing a non-platinum catalyst and platinum particles not being carried on the non-platinum catalyst, wherein a content of the platinum particles per unit area of the battery electrode is 0.0010 mg/cm$^2$ or more and 0.1200 mg/cm$^2$ or less. According to the embodiment of the present invention, a battery having excellent characteristics at low cost is provided.

In addition, in the battery electrode, the platinum particles may have an average particle diameter of 30.0 nm or less. In addition, in the battery electrode, the non-platinum catalyst may be a carbon catalyst. In this case, the carbon catalyst may be a nitrogen-containing carbon catalyst. Further, in this case, the nitrogen-containing carbon catalyst may have, on a surface thereof, a ratio of number of nitrogen atoms to number of carbon atoms of 0.001 or more and 0.600 or less.

In addition, in the battery electrode, the carbon catalyst may contain a metal other than platinum. In this case, the battery electrode may have a mass ratio of a content of the platinum to a content of the metal other than platinum of 0.04 or more and 20.00 or less.

In addition, the carbon catalyst may have a carbon structure in which area ratios of three peaks $f_{broad}$, $f_{middle}$ and $f_{narrow}$ obtained by separating a peak having a peak top in a vicinity of a diffraction angle of 26° in an X-ray diffraction pattern obtained by powder X-ray diffraction satisfy the following conditions (a) to (c):

(a) $f_{broad}$: 60.0% or more and 96.0% or less;
(b) $f_{middle}$: 3.5% or more and 32.0% or less; and
(c) $f_{narrow}$: 0.4% or more and 15.0% or less.

In addition, the carbon catalyst may have a carbon structure which exhibits a carbon monoxide desorption amount at from 150° C. to 1,000° C. of 0.250 mmol/g or more and a carbon dioxide desorption amount at from 150° C. to 900° C. of 0.040 mmol/g or more in a temperature programmed desorption method including measuring desorption amounts of carbon monoxide and carbon dioxide at from 0° C. to 1,000° C.

A composition for a catalyst layer of a battery electrode according to one embodiment of the present invention for achieving the object is a composition for a catalyst layer of a battery electrode, which is used for forming a catalyst layer of a battery electrode, wherein the composition includes a non-platinum catalyst and platinum particles not being carried on the non-platinum catalyst, and wherein the composition is used so that a content of the platinum particles per unit area of the battery electrode is from 0.0010 mg/cm$^2$ or more and 0.1200 mg/cm$^2$ or less. According to the embodiment of the present invention, the composition for a catalyst layer of a battery electrode which enables a battery electrode having excellent characteristics at low cost is provided.

In addition, in the composition for a catalyst layer of a battery electrode, the non-platinum catalyst may be a carbon catalyst, and the composition for a catalyst layer of a battery electrode may have a carbon monoxide desorption amount at from 150° C. to 1,000° C. of 0.150 mmol/g or more and a carbon dioxide desorption amount at from 150° C. to 900° C. of 0.030 mmol/g or more in a temperature programmed desorption method including measuring desorption amounts of carbon monoxide and carbon dioxide at from 0° C. to 1,000° C.

In addition, in the composition for a catalyst layer of a battery electrode, the non-platinum catalyst may be a carbon catalyst containing a metal other than platinum. In this case, the composition may have a mass ratio of a content of the platinum to a content of the metal other than platinum of 0.04 or more and 20.00 or less.

A battery according to one embodiment of the present invention for achieving the object includes any one of the above-mentioned battery electrodes. According to the embodiment of the present invention, a battery having excellent characteristics at low cost is provided.

In addition, the battery may be a fuel cell.

Advantageous Effects of Invention

According to the present invention, a battery electrode, a composition for a catalyst layer of a battery electrode, and a battery, each having excellent characteristics at low cost, are provided.

BRIEF DESCRIPTION OF DRAWINGS

FIG. 1A is an explanatory view for showing the characteristics of a carbon catalyst and a platinum-carrying carbon material used in an Example according to one embodiment of the present invention.

FIG. 1B is an explanatory view for showing the characteristics of a composition for a catalyst layer of a battery electrode and a battery electrode produced in an Example according to the embodiment of the present invention.

FIG. 2A is an explanatory view for showing an example of the result of XRD peak separation of a carbon catalyst CA-Ia used in an Example according to the embodiment of the present invention.

FIG. 2B is an explanatory view for showing an example of the result of XRD peak separation of a carbon catalyst CA-III used in an Example according to the embodiment of the present invention.

FIG. 2C is an explanatory view for showing an example of the result of XRD peak separation of a carbon catalyst CA-IV used in an Example according to the embodiment of the present invention.

FIG. 2D is an explanatory view for showing an example of the result of XRD peak separation of Ketjen black used in an Example according to the embodiment of the present invention.

DESCRIPTION OF EMBODIMENTS

Figure 3A:
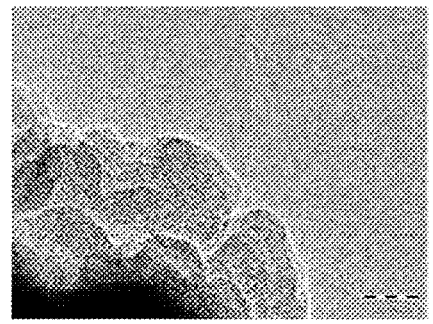
FIG. 3A is an explanatory view for showing an example of a transmission electron micrograph of the carbon catalyst CA-Ia used in an Example according to the embodiment of the present invention.
Figure 3B:
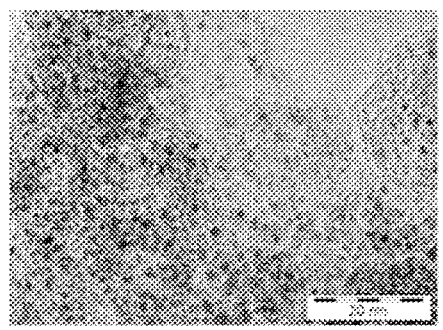
FIG. 3B is an explanatory view for showing an example of a transmission electron micrograph of platinum particles carried on carbon carrier particles used in an Example according to the embodiment of the present invention.

Now, embodiments of the present invention will be described. The present invention is not limited to the examples shown in these embodiments.

A battery electrode according to one embodiment of the present invention (hereinafter referred to as "electrode of the present invention") is a battery electrode including a catalyst layer containing a non-platinum catalyst and platinum particles not being carried on the non-platinum catalyst, in which the content of the platinum particles per unit area of the battery electrode is 0.0010 mg/cm$^2$ or more and 0.1200 mg/cm$^2$ or less.

The inventors of the present invention have performed extensive investigations into technical means for achieving a battery electrode having excellent characteristics at low cost, and as a result, have surprisingly and uniquely found that, when a battery electrode including a non-platinum catalyst further includes platinum particles which are not carried on the non-platinum catalyst in an amount within a specific significantly small range, excellent characteristics are exhibited. Thus, the present invention has been completed.

That is, in the electrode of the present invention, the content of the platinum particles per unit area of the battery electrode is 0.0010 mg/cm$^2$ or more and 0.1200 mg/cm$^2$ or less, and thus, for example, the electrode of the present invention includes a uniform catalyst layer and exhibits excellent durability at low cost.

When the content of the platinum particles per unit area of the battery electrode is more than 0.1200 mg/cm$^2$, cracks are likely to be formed during formation of the catalyst layer, and it is not easy to form the uniform catalyst layer. In addition, cost is increased owing to an increase in content of the platinum particles.

The catalyst layer of the electrode of the present invention is formed through use of a composition including a non-platinum catalyst and platinum particles not being carried on the non-platinum catalyst. In this regard, a composition for a catalyst layer of a battery electrode according to one embodiment of the present invention (hereinafter referred to as "composition of the present invention") is a composition which is used for forming a catalyst layer of a battery electrode, in which the composition includes a non-platinum catalyst and platinum particles not being carried on the non-platinum catalyst, and in which the composition is used so that the content of the platinum particles per unit area of the battery electrode is 0.0010 mg/cm$^2$ or more and 0.1200 mg/cm$^2$ or less.

Accordingly, one embodiment of the present invention includes use of the composition including a non-platinum catalyst and platinum particles not being carried on the non-platinum catalyst for forming a catalyst layer of a battery electrode so that the content of the platinum particles per unit area of the battery electrode is 0.0010 mg/cm$^2$ or more and 0.1200 mg/cm$^2$ or less.

A battery according to one embodiment of the present invention (hereinafter referred to as "battery of the present invention") includes the electrode of the present invention described above. The battery of the present invention is not particularly limited as long as the battery includes the electrode of the present invention, but for example, may be a chemical battery and is preferably a fuel cell.

When the battery of the present invention is a fuel cell, the battery of the present invention is, for example, preferably a polymer electrolyte fuel cell, particularly preferably a polymer electrolyte fuel cell using hydrogen as a fuel. The battery of the present invention may include a membrane electrode assembly (MEA) including the electrode of the present invention. The membrane electrode assembly may include, for example, an electrolyte membrane, a positive electrode (cathode), a negative electrode (anode), and a gas diffusion layer. The battery of the present invention may include the electrode of the present invention as a cathode.

In these embodiments, the content of the platinum particles per unit area of the battery electrode is not particularly limited as long as the content of the platinum particles falls within a range of 0.0010 mg/cm$^2$ or more and 0.1200 mg/cm$^2$ or less, but for example, is particularly preferably 0.0010 mg/cm$^2$ or more and 0.0500 mg/cm$^2$ or less. In this case, the battery electrode including a uniform catalyst layer is more reliably achieved at low cost.

As described above, the electrode of the present invention and the composition of the present invention each include the platinum particles which are not carried on the non-platinum catalyst. The platinum particles are not particularly limited as long as the platinum particles are platinum-containing fine particles, and may be, for example, platinum fine particles and/or platinum alloy fine particles. The shapes of the platinum particles are not particularly limited, and the platinum particles may include, for example, one or more selected from a group consisting of a spherical body, a polyhedral body (e.g., a polyhedral body having two or more polygonal surfaces, such as rhombic surfaces or rectangular surfaces), and a core-shell body.

The platinum particles may have an average particle diameter of, for example, 30.0 nm or less. Further, the platinum particles have an average particle diameter of preferably 27.0 nm or less, more preferably 17.0 nm or less, particularly preferably 14.0 nm or less. When the average particle diameter of the platinum particles is the above-mentioned threshold value or less, a battery electrode having better durability is achieved. A lower limit value of the average particle diameter of the platinum particles is not particularly limited, but the platinum particles may have an average particle diameter of, for example, 0.5 nm or more.

The electrochemical active surface area (ECA) of the platinum particles is not particularly limited, but may be, for example, 9.0 m$^2$/g or more, and is preferably 11.0 m$^2$/g or more, more preferably 26.0 m$^2$/g or more, still more preferably 30.0 m$^2$/g or more, particularly preferably 40.0 m$^2$/g or more. An upper limit value of the ECA of the platinum particles is not particularly limited, but the ECA of the platinum particles may be, for example, 200.0 m$^2$/g or less.

The platinum particles are preferably carried on carrier particles (carrier particles other than the non-platinum catalyst). In this case, the carrier particles carrying the platinum particles are not particularly limited as long as the carrier particles are particles other than the non-platinum catalyst, but for example, the carrier particles may be one or more selected from a group consisting of carbon carrier particles, ceramics (e.g., one or more selected from a group consisting of alumina, silica, and cordierite), titanium oxide, tin oxide, tin oxide doped with niobium, and tin oxide doped with antimony. Of those, the carbon carrier particles are particularly preferred.

The carbon carrier particles are not particularly limited as long as the carbon carrier particles are formed of a carbon material capable of carrying the platinum particles, but are preferably formed of a conductive carbon material. Specifically, for example, the carbon carrier particles may be formed of one or more carbon materials selected from a group consisting of carbon black (e.g., Ketjen black and/or Vulcan), a carbon nanotube, a carbon fiber, graphite, graphite oxide, graphene, and activated carbon.

In the following description, when each of the electrode of the present invention and the composition of the present invention includes the platinum particles carried on the carrier particles other than the non-platinum catalyst, a composite of the carrier particles and the platinum particles is referred to as "Pt/carrier". Particularly when the carrier particles are the carbon carrier particles, a composite of the carbon carrier particles and the platinum particles is referred to as "Pt/C".

When each of the electrode of the present invention and the composition of the present invention includes the Pt/carrier, the content of the Pt/carrier (e.g., Pt/C) per unit area of the electrode of the present invention is not particularly limited, but may be, for example, 0.0050 mg/cm$^2$ or more and 0.6000 mg/cm$^2$ or less. The content of the Pt/carrier (e.g., Pt/C) per unit area of the electrode of the present invention is preferably 0.0050 mg/cm$^2$ or more and 0.2500 mg/cm$^2$ or less. In this case, a battery electrode including a uniform catalyst layer is more reliably achieved.

The content of the platinum particles with respect to the entirety of the Pt/carrier (e.g., Pt/C) is not particularly limited, but may be, for example, 10 wt % or more and 70 wt % or less, and is preferably 10 wt % or more and 60 wt % or less, more preferably 10 wt % or more and 50 wt % or less.

The non-platinum catalyst is not particularly limited as long as the non-platinum catalyst is a catalyst having catalytic activity in the battery electrode but is not platinum, and may be, for example, a carbon catalyst and/or a metal catalyst. The metal catalyst may be, for example, one or more selected from a group consisting of a metal oxide-based non-platinum catalyst, a metal complex catalyst, and an alloy catalyst (e.g., an alloy catalyst of an iron group element and another transition metal and/or a ruthenium-based alloy catalyst).

However, the non-platinum catalyst is particularly preferably a carbon catalyst. The carbon catalyst is formed of a carbon material having catalytic activity (e.g., oxygen reduction activity). The carbon catalyst preferably has a particulate form. In this case, the average particle diameter of the carbon catalyst particles is not particularly limited, but may be, for example, 0.05 μm or more and 10.00 μm or less, and is preferably 0.10 μm or more and 5.00 μm or less.

The content of the non-platinum catalyst (e.g., the carbon catalyst) per unit area of the battery electrode is not particularly limited, but may be, for example, 0.5 mg/cm$^2$ or more and 5.0 mg/cm$^2$ or less, 0.8 mg/cm$^2$ or more and 4.0 mg/cm$^2$ or less, or 1.0 mg/cm$^2$ or more and 2.50 mg/cm$^2$ or less.

The carbon catalyst may be, for example, a nitrogen-containing carbon catalyst. The nitrogen-containing carbon catalyst is a carbon catalyst having a carbon structure including a nitrogen atom. The nitrogen-containing carbon catalyst is produced by, for example, carbonizing a raw material including a nitrogen-containing organic substance (e.g., an organic compound including one or more nitrogen atoms in a molecule thereof). That is, in this case, the nitrogen-containing carbon catalyst is a carbonized product of the raw material including a nitrogen-containing organic substance.

A ratio of number of nitrogen atoms to number of carbon atoms (N/C ratio) on the surface of the nitrogen-containing carbon catalyst is not particularly limited, but may be, for example, 0.001 or more and 0.600 or less. In addition, for example, the N/C ratio is preferably 0.005 or more and 0.300 or less, particularly preferably 0.010 or more and 0.300 or less. In addition, the N/C ratio of the carbon catalyst may be, for example, 0.010 or more and 0.200 or less or 0.010 or more and 0.100 or less. The N/C ratio of the carbon catalyst is measured by X-ray photoelectron spectroscopy (XPS).

The carbon catalyst may contain a metal other than platinum (non-platinum metal). The non-platinum metal may be, for example, one or more kinds selected from a group consisting of Group 3 elements to Group 14 elements in the periodic table. More specifically, the non-platinum metal is preferably one or more kinds selected from a group consisting of, for example, titanium (Ti), chromium (Cr), manganese (Mn), iron (Fe), cobalt (Co), nickel (Ni), copper (Cu), zinc (Zn), germanium (Ge), silver (Ag), and tin (Sn).

The content of the non-platinum metal in the carbon catalyst is not particularly limited, but may be, for example, 0.001 wt % or more and 30.000 wt % or less or 0.002 wt % or more and 20.000 wt % or less.

The carbon catalyst containing the non-platinum metal is produced by, for example, carbonizing a raw material including an organic substance and the non-platinum metal. That is, in this case, the carbon catalyst is a carbonized product of the raw material including an organic substance and the non-platinum metal. The raw material to be carbonized is prepared by, for example, mixing at least the organic substance and the non-platinum metal. In this case, the carbon catalyst is a carbonized product of a mixture containing the organic substance and the non-platinum metal. When the nitrogen-containing organic substance is used as the organic substance, the carbon catalyst is a nitrogen-containing carbon catalyst containing the non-platinum metal.

The carbon catalyst may contain the non-platinum metal in the inside thereof. That is, when the carbon catalyst is the carbonized product of the raw material including the organic substance and the non-platinum metal, the carbon catalyst contains the non-platinum metal derived from the raw material at least in the inside thereof. Specifically, when the carbon catalyst has a porous structure, the carbon catalyst may contain the non-platinum metal in the inside of a skeleton of the porous structure.

In addition, when the non-platinum catalyst in each of the catalyst layer of the electrode of the present invention and the composition of the present invention is the carbon catalyst containing the non-platinum metal, a mass ratio of the content of platinum to the content of the non-platinum metal in the catalyst layer and the composition of the present invention may be 0.04 or more and 20.00 or less. In this case, the mass ratio of the content of the platinum to the content of the non-platinum metal in each of the catalyst layer of the electrode of the present invention and the composition of the present invention may be, for example, 0.04 or more and 10.00 or less or 0.04 or more and 9.00 or less.

The organic substance in the raw material to be carbonized in the production of the carbon catalyst is not particularly limited as long as the organic substance is carbonized, and may be, for example, one or more selected from a group consisting of a phenol resin, polyfurfuryl alcohol, furan, a furan resin, a phenol formaldehyde resin, melamine, a melamine resin, an epoxy resin, a nitrogen-containing chelate resin (e.g., one or more kinds selected from a group consisting of polyamine-type, iminodiacetic acid-type, aminophosphoric acid-type, and aminomethylphosphonic acid-type), a polyamide-imide resin, pyrrole, polypyrrole, polyvinyl pyrrole, 3-methyl polypyrrole, acrylonitrile, polyacrylonitrile, a polyacrylonitrile-polymethacrylic acid copolymer, polyvinylidene chloride, thiophene, oxazole, thiazole, pyrazole, vinylpyridine, polyvinylpyridine, pyridazine, pyrimidine, piperazine, pyran, morpholine, imidazole, 1-methylimidazole, 2-methylimidazole, quinoxaline, aniline, polyaniline, succinic acid dihydrazide, adipic acid dihydrazide, polysulfone, polyaminobismaleimide, polyimide, polyvinyl alcohol, polyvinyl butyral, benzimidazole, polybenzimidazole, polyamide, polyester, polylactic acid, polyether, polyether ether ketone, cellulose, carboxymethyl cellulose, lignin, chitin, chitosan, pitch, lignite, silk, wool, polyamino acid, a nucleic acid, DNA, RNA, hydrazine, hydrazide, urea, salen, polycarbazole, polybismaleimide, triazine, polyacrylic acid, polyacrylate, polymethacrylate, polymethacrylic acid, polyurethane, polyamidoamine, and polycarbodiimide.

The conditions of the carbonization are not particularly limited as long as the organic substance in the raw material is carbonized. Specifically, a carbonization temperature may be, for example, 300° C. or more and 3,000° C. or less, or 700° C. or more and 2,000° C. or less. In addition, a temperature increase rate for the carbonization temperature may be, for example, 0.5° C./min or more and 300° C./min or less. A time period for which the raw material is kept at the carbonization temperature may be, for example, 5 minutes or more and 24 hours or less. The carbonization is preferably performed under a flow of inert gas such as nitrogen gas.

The carbon catalyst may have a carbon structure in which area ratios of three peaks $f_{broad}$, $f_{middle}$ and $f_{narrow}$ obtained by separating a peak having a peak top in the vicinity of a diffraction angle of 26° in an X-ray diffraction pattern obtained by powder X-ray diffraction satisfy the following conditions (a) to (c): (a) $f_{broad}$: 60.0% or more and 96.0% or less; (b) $f_{middle}$: 3.5% or more and 32.0% or less; and (c) $f_{narrow}$: 0.4% or more and 15.0% or less.

Now, the peak separation will be described in detail. The peak separation is performed by separating a peak in the vicinity of a diffraction angle 2θ of 26° (e.g., within a range of the diffraction angle of from 23° to 27° or within a range of the diffraction angle of from 24° to 27°) (peak having a peak top in the vicinity of the diffraction angle 2θ of 26°) into the following three components: $f_{broad}$, $f_{middle}$ and $f_{narrow}$. More specifically, the peak separation is performed by the following procedure. First, an X-ray diffraction pattern obtained by powder X-ray diffraction measurement is subjected to intensity correction of a polarization factor, a Lorentz factor, and an atom scattering factor of carbon, and is also subjected to background correction in which a straight line connecting an intensity in the vicinity of the diffraction angle of from 10° to 20° to an intensity in the vicinity of the diffraction angle of from 30° to 40° is defined as a background, and the background is subtracted from each diffraction intensity after the intensity correction. Next, in the corrected X-ray diffraction pattern, the peak separation is performed by: approximating the peak having a peak top in the vicinity of the diffraction angle 2θ of 26° by superimposed Gaussian basic waveforms; optimizing a peak intensity, a peak half width and a peak position; and subjecting each of three superimposed peaks included in the above-mentioned peak to curve fitting. The curve fitting is performed so that a residual sum of squares becomes smallest. The residual square refers to a square of a residual error at each measured diffraction angle, and the residual sum of squares refers to a sum of residual squares. In addition, the residual error refers to a difference between the intensity of the peak having a peak top in the vicinity of the diffraction angle 2θ of 26° in the corrected X-ray diffraction pattern and the sum of intensities of the three separated peaks ($f_{broad}$, $f_{middle}$ and $f_{narrow}$).

Through such peak separation, three peaks, that is, the two peaks $f_{broad}$ and $f_{middle}$ of a low-crystalline component and the peak $f_{narrow}$ of a high-crystalline component, are obtained. The peak $f_{broad}$ is observed in the vicinity of a diffraction angle of 24.0°±4.0° and is defined as a peak having a half width of 10°±5.0°. The peak $f_{middle}$ is observed in the vicinity of a diffraction angle of 26.3°±1.5° and is defined as a peak having a half width of 3.5°±3.0°. The peak $f_{narrow}$ is observed in the vicinity of a diffraction angle of 26.5°±1.0° and is defined as a peak having a half width of 1.0°±0.9°.

The above-mentioned three peaks of the carbon catalyst may satisfy the following conditions (a) to (c): (a) $f_{broad}$: 70.0% or more and 96.0% or less; (b) $f_{middle}$: 3.5% or more and 20.0% or less; and (c) $f_{narrow}$: 0.4% or more and 13.0% or less. In this case, a battery electrode having excellent durability is achieved.

The carbon catalyst may have a carbon structure which exhibits a carbon monoxide (CO) desorption amount at from 150° C. to 1,000° C. of 0.250 mmol/g or more and a carbon dioxide ($CO_2$) desorption amount at from 150° C. to 900° C. of 0.040 mmol/g or more in a temperature programmed desorption method (TPD) including measuring desorption amounts of carbon monoxide and carbon dioxide at from 0° C. to 1,000° C.

Herein, the TPD involves subjecting the carbon catalyst to heat treatment for desorbing a functional group from a carbon structure of the carbon catalyst, chemically adsorbing oxygen into the carbon structure, and then measuring a CO desorption amount and a $CO_2$ desorption amount from the carbon structure for one gram of the carbon catalyst within a temperature range of from 0° C. to 1,000° C.

As described above, in such TPD, the carbon catalyst has a CO desorption amount at from 150° C. to 1,000° C. of 0.250 mmol/g or more and a $CO_2$ desorption amount at from 150° C. to 900° C. of 0.040 mmol/g or more. In the TPD, a temperature at which the $CO_2$ desorption amount from the carbon catalyst at from 150° C. to 900° C. reaches a maximum value falls within a range of from 200° C. to 340° C.

In addition, the carbon catalyst may have a CO desorption amount of 0.300 mmol/g or more and a $CO_2$ desorption amount of 0.110 mmol/g or more. In this case, a battery electrode having excellent durability is achieved. Upper limit values of those desorption amounts are not particularly limited, but for example, the CO desorption amount and the $CO_2$ desorption amount may be 1.000 mmol/g or less and 0.500 mmol/g or less, respectively.

In addition, when the non-platinum catalyst in the composition of the present invention is the carbon catalyst, the composition of the present invention may have a CO desorption amount at from 150° C. to 1,000° C. of 0.150 mmol/g or more and a $CO_2$ desorption amount at from 150° C. to 900° C. of 0.030 mmol/g or more in a temperature programmed desorption method including measuring CO and $CO_2$ desorption amounts at from 0° C. to 1,000° C.

In addition, the composition of the present invention may have a CO desorption amount and a $CO_2$ desorption amount of 0.170 mmol/g or more and 0.060 mmol/g or more, respectively. In this case, a battery electrode having excellent durability is achieved. Upper limit values of those desorption amounts are not particularly limited, but for example, the CO desorption amount and the $CO_2$ desorption amount may be 0.60 mmol/g or less and 0.30 mmol/g or less, respectively.

The carbon catalyst preferably has oxygen reduction activity as catalytic activity. In this case, for example, the carbon catalyst effectively catalyzes an oxygen reduction reaction at an electrode of a fuel cell. The oxygen reduction activity of the carbon catalyst is evaluated, for example, based on an oxygen reduction starting potential. Specifically, the oxygen reduction starting potential is determined as a voltage $E_{O2}$ at which a reduction current of $-10$ $\mu A/cm^2$ flows in data (oxygen reduction voltammogram) representing a relationship between the voltage and the current density obtained by performing sweep application of a potential through use of a rotating ring disk electrode apparatus including a working electrode having the carbon catalyst applied thereto.

Specifically, the oxygen reduction starting potential $E_{O2}$ exhibited by the carbon catalyst may be, for example, from 0.60 V or more versus a normal hydrogen electrode (vs. NHE) and 1.2 V or less vs. NHE, and is preferably 0.80 V or more vs. NHE and 1.2 V or less vs. NHE, particularly preferably 0.82 V or more vs. NHE and 1.2 V or less vs. NHE.

In addition, the oxygen reduction activity of the carbon catalyst is also evaluated based on, for example, a current density $i_{0.7}$ ($mA/cm^2$) at a time of application of a voltage of 0.7 V (vs. NHE) in the above-mentioned oxygen reduction voltammogram.

In this case, the current density $i_{0.7}$ exhibited by the carbon catalyst may be, for example, $-1.0$ ($mA/cm^2$) or less (e.g., $-5.0$ ($mA/cm^2$) or more, and $-1.0$ ($mA/cm^2$) or less), and is preferably $-1.1$ ($mA/cm^2$) or less (e.g., $-4.0$ ($mA/cm^2$) or more, and $-1.1$ ($mA/cm^2$) or less).

As described above, the composition of the present invention is a composition which is used for forming a catalyst layer of a battery electrode, in which the composition includes a non-platinum catalyst and platinum particles not being carried on the non-platinum catalyst. The composition of the present invention is produced by mixing at least the non-platinum catalyst and the platinum particles. Specifically, for example, when the composition of the present invention is a composition which is used for forming a catalyst layer of an electrode of a fuel cell, the composition of the present invention is produced by mixing the non-platinum catalyst (e.g., carbon catalyst), the platinum particles which are not carried on the non-platinum catalyst (e.g., Pt/carrier), and an electrolyte material (e.g., NAFION™).

As described above, the electrode of the present invention includes the catalyst layer formed through use of the composition of the present invention. The catalyst layer is formed by applying the composition of the present invention onto a base material, followed by drying. Specifically, for example, when the electrode of the present invention is an electrode of a fuel cell, the electrode of the present invention is produced by, for example, applying the composition of the present invention in a slurry form onto the surface of a carbon material to be used as a gas diffusion layer or onto the surface of an electrolyte membrane, followed by drying.

Each of the catalyst layer of the electrode of the present invention and the composition of the present invention includes the non-platinum catalyst and the platinum particles not being carried on the non-platinum catalyst, and hence an electrolyte material intervenes between the non-platinum catalyst and the platinum particles. That is, each of the catalyst layer of the electrode of the present invention and the composition of the present invention includes the electrolyte material intervening between the non-platinum catalyst and the platinum particles, and the non-platinum catalyst and the platinum particles are each brought into contact with the electrolyte material.

Herein, for example, in a case where platinum particles being carried on a non-platinum catalyst are used as the platinum particles, the platinum particles are brought into direct contact with the non-platinum catalyst without the intervention of the electrolyte material in each of the catalyst layer and the composition for a catalyst layer.

In contrast, the composition of the present invention is prepared by mixing the non-platinum catalyst, the platinum particles not being carried on the non-platinum catalyst, and the electrolyte material, and hence the electrolyte material inevitably intervenes between the non-platinum catalyst and the platinum particles in each of the composition of the present invention and the catalyst layer of the electrode of the present invention formed through use of the composition of the present invention.

Therefore, for example, when observed with a transmission electron microscope, each of the catalyst layer of the electrode of the present invention and the composition of the present invention is observed to include the non-platinum catalyst, and the platinum particles forming secondary particles (when the Pt/carrier is used, secondary particles of the Pt/carrier). That is, in this case, each of the catalyst layer of the electrode of the present invention and the composition of the present invention includes the non-platinum catalyst and the platinum particles that are not brought into direct contact with each other.

In contrast, in a case where the platinum particles carried on a non-platinum catalyst are used, the platinum particles are observed to be present in a quite well dispersed manner in each of the catalyst layer and the composition for a catalyst layer.

In a case where the composition of the present invention is prepared by mixing the non-platinum catalyst, the platinum particles not being carried on particles of the non-platinum catalyst, and the electrolyte material, and where the catalyst layer of the electrode of the present invention is formed through use of the composition of the present invention, the platinum particles are observed in a state of being separated from the non-platinum catalyst when, for example, first, the catalyst layer is subjected to treatment in which the electrolyte material is washed out, and then, the non-platinum catalyst and the platinum particles after the treatment are observed.

In contrast, in a case where the composition for a catalyst layer of a battery electrode is prepared by mixing the platinum particles carried on a non-platinum catalyst and an electrolyte material, and where the catalyst layer of the electrode is formed through use of the composition, the platinum particles are observed in a state of being carried on the non-platinum catalyst when, first, the catalyst layer is subjected to treatment in which the electrolyte material is washed out, and then, the non-platinum catalyst and the platinum particles after the treatment are observed.

Next, specific Examples according to the embodiments of the present invention will be described.

EXAMPLES

[Production of Carbon Catalysts CA-Ia to CA-Id]

First, a raw material to be carbonized was prepared. 1.0 g of a polyacrylonitrile-polymethacrylic acid copolymer (PAN/PMA) was added to be dissolved in 15 g of dimethylformamide, to thereby prepare a solution (a). In addition, 1.0 g of 2-methylimidazole and 5.78 g of zinc chloride ($ZnCl_2$) were added to be dissolved in 15 g of dimethylformamide, to thereby prepare a solution (b). Next, the solution (a) and the solution (b) were mixed, and 0.187 g of iron powder was further added thereto and mixed therein. After that, the resultant mixed solution was vacuum dried at 60° C. all day and night.

Next, the mixture obtained through the above-mentioned vacuum drying was heated in the atmosphere to be subjected to infusibilization. Specifically, the above-mentioned mixture was heated in the atmosphere so as to be increased in temperature from room temperature to 150° C. in 30 minutes and then increased in temperature from 150° C. to 220° C. in 2 hours. After that, the mixture was kept at 220° C. for 3 hours to be subjected to infusibilization. Thus, the raw material to be carbonized was prepared.

In addition, the raw material obtained through the above-mentioned infusibilization was pulverized. Silicon nitride balls each having a diameter of 10 mm were set in a planetary ball mill (P-7, manufactured by Fritsch Japan Co., Ltd.), and the raw material was pulverized with the planetary ball mill.

Next, the raw material was carbonized. The raw material obtained through the above-mentioned drying and infusibilization was placed in a quartz tube. The raw material was heated to 1,100° C. in an image furnace under a nitrogen atmosphere and kept in this state for 1 hour to be carbonized.

In addition, the carbonized material obtained through the above-mentioned carbonization was pulverized. Silicon nitride balls each having a diameter of 10 mm were set in a planetary ball mill (P-7, manufactured by Fritsch Japan Co., Ltd.), and the carbonized material was pulverized with the planetary ball mill. Further, zirconia beads each having a diameter of 0.3 mm and methanol were loaded into a bead mill (manufactured by AIMEX Co., Ltd.), and the carbonized material was pulverized with the bead mill.

Further, metal removal treatment was performed by acid washing. 20 mL of concentrated hydrochloric acid was added to 1.0 g of the carbonized material obtained through the above-mentioned pulverization, and the resultant was stirred for 30 minutes. The carbonized material was precipitated, and the solution was removed. This treatment was repeated several times, and then distilled water was added to the resultant, followed by stirring. The solution containing the carbonized material was filtered with a filtration membrane and washed with distilled water until the filtrate became neutral. The collected carbonized material was subjected to vacuum drying. Further, the dried carbonized material was pulverized with a mortar.

Next, heat treatment was performed. The carbonized material which had been subjected to the metal removal treatment as described above was placed in a quartz tube. The carbonized material was heated to 700° C. in an image furnace in a nitrogen atmosphere and kept in this state for 1 hour to be subjected to heat treatment after the metal removal treatment. Then, the carbonized material after the above-mentioned heat treatment was pulverized. Specifically, the carbonized material was pulverized with the above-mentioned planetary ball mill. Thus, a carbon catalyst CA-Ia, which was a carbonized material in a powder form having a carbon structure including zinc and iron, was obtained.

In addition, a carbon catalyst CA-Ib, which was a carbonized material in a powder form having a carbon structure including iron and tin, was obtained in the same manner as in the production of the carbon catalyst CA-Ia except that 0.9 g of iron (III) chloride hexahydrate ($FeCl_3 \cdot 6H_2O$) was used instead of 5.78 g of zinc chloride ($ZnCl_2$), 6.39 g of tin (IV) oxide ($SnO_2$) was used instead of 0.187 g of the iron powder, and a carbonization temperature of 1,000° C. was adopted instead of 1,100° C.

In addition, a carbon catalyst CA-Ic, which was a carbonized material in a powder form having a carbon structure including germanium and iron, was obtained in the same manner as in the production of the carbon catalyst CA-Ia except that 0.901 g of germanium (IV) chloride ($GeCl_4$) was used instead of 5.78 g of zinc chloride ($ZnCl_2$), and a carbonization temperature of 1,000° C. was adopted instead of 1,100° C.

In addition, a carbon catalyst CA-Id, which was a carbonized material in a powder form having a carbon structure including copper and iron, was obtained in the same manner as in the production of the carbon catalyst CA-Ia except that 0.416 g of copper (I) chloride (CuCl) was used instead of 5.78 g of zinc chloride ($ZnCl_2$), and a carbonization temperature of 1,000° C. was adopted instead of 1,100° C.

[Production of Carbon Catalysts CA-IIa and CA-IIb]

A carbon catalyst CA-IIa, which was a carbonized material in a powder form having a carbon structure including iron, was obtained in the same manner as in the production of the carbon catalyst CA-Ia except that 0.18 g of iron (III) chloride hexahydrate ($FeCl_3 \cdot 6H_2O$) was used instead of 5.78 g of zinc chloride ($ZnCl_2$), and the iron powder was not used.

In addition, a carbon catalyst CA-IIb, which was a carbonized material in a powder form having a carbon structure including cobalt, was obtained in the same manner as in the production of the carbon catalyst CA-Ia except that 0.16 g of cobalt chloride hexahydrate ($CoCl_2.6H_2O$) was used instead of 5.78 g of zinc chloride ($ZnCl_2$), and the iron powder was not used.

[Production of Carbon Catalyst CA-III]

First, a raw material to be carbonized was prepared. 1.5 g of a polyacrylonitrile-polymethacrylic acid copolymer (PAN/PMA), 1.5 g of 2-methylimidazole, and 1.25 g of iron(III) chloride hexahydrate ($FeCl_3.6H_2O$) were added to and mixed in 30 g of dimethylformamide. After that, the resultant mixed solution was vacuum dried at 60° C. all day and night.

Next, the mixture obtained through the above-mentioned vacuum drying was heated in the atmosphere to be subjected to infusibilization. Specifically, the above-mentioned mixture was heated in the atmosphere so as to be increased in temperature from room temperature to 150° C. in 30 minutes and then increased in temperature from 150° C. to 220° C. in 2 hours. After that, the mixture was kept at 220° C. for 3 hours to be subjected to infusibilization. Thus, the raw material to be carbonized was prepared.

Next, the raw material was carbonized. The raw material obtained through the above-mentioned drying and infusibilization was placed in a quartz tube. The raw material was heated to 800° C. in an image furnace under a nitrogen atmosphere and kept in this state for 1 hour to be carbonized.

In addition, the carbonized material obtained through the above-mentioned carbonization was pulverized. Zirconia balls each having a diameter of 10 mm were set in a planetary ball mill (P-7, manufactured by Fritsch Japan Co., Ltd.), and the carbonized material was pulverized with the planetary ball mill.

Further, metal removal treatment was performed by acid washing. 100 mL of concentrated hydrochloric acid was added to the carbonized material obtained through the above-mentioned pulverization, and the resultant was stirred for 1 hour. Next, the carbonized material was precipitated, and the solution was removed, and then 100 mL of a solution obtained by mixing concentrated hydrochloric acid and distilled water at 1:1 (in volume ratio) was added to the resultant, followed by stirring for 1 hour. The carbonized material was precipitated, and the solution was removed, and then 100 mL of distilled water was added to the resultant, followed by stirring for 1 hour. After that, the solution containing the carbonized material was filtered with a filtration membrane and washed with distilled water until the filtrate became neutral. The collected carbonized material was subjected to vacuum drying. Further, the dried carbonized material was pulverized with a mortar.

Next, heat treatment was performed. The carbonized material having been subjected to the metal removal treatment as described above was placed in a quartz tube. The carbonized material was heated to 700° C. in an image furnace in a nitrogen atmosphere and kept in this state for 1 hour to be subjected to heat treatment after the metal removal treatment. Then, the carbonized material after the above-mentioned heat treatment was pulverized. Specifically, the carbonized material was pulverized with the above-mentioned planetary ball mill. Thus, a carbon catalyst CA-III, which was a carbonized material in a powder form having a carbon structure including iron, was obtained.

[Production of Carbon Catalyst CA-IV]

First, a raw material to be carbonized was prepared. 3.3 g of a phenol resin (RESITOP PSK-2320, manufactured by Gunei Chemical Industry Co., Ltd.) was added to be dissolved in 237 g of acetone, and 1.0 g iron phthalocyanine (manufactured by Tokyo Chemical Industry Co., Ltd.) was added thereto and mixed therein. After that, the resultant mixed solution was vacuum dried at 60° C. all day and night.

Next, the raw material was carbonized. The raw material obtained through the above-mentioned drying was placed in a quartz tube. The raw material was heated to 600° C. in an image furnace under a nitrogen atmosphere and kept in this state for 5 hours to be carbonized.

In addition, the carbonized material obtained through the above-mentioned carbonization was pulverized. Silicon nitride balls each having a diameter of 10 mm were set in a planetary ball mill (P-7, manufactured by Fritsch Japan Co., Ltd.), and the carbonized material was pulverized with the planetary ball mill.

Further, metal removal treatment was performed by acid washing. 20 mL of concentrated hydrochloric acid was added to 1.0 g of the carbonized material obtained through the above-mentioned pulverization, and the resultant was stirred for 30 minutes. The carbonized material was precipitated, and the solution was removed. This treatment was repeated several times, and then distilled water was added to the resultant, followed by stirring. The solution containing the carbonized material was filtered with a filtration membrane and washed with distilled water until the filtrate became neutral. The collected carbonized material was subjected to vacuum drying. Further, the dried carbonized material was pulverized with a mortar.

Next, activation treatment was performed. The carbonized material having been subjected to the metal removal treatment as described above was placed in a quartz tube. The carbonized material was heated to 800° C. in an image furnace in an atmosphere of an ammonia gas and a nitrogen gas at 1:1 and kept in this state for 1 hour to be subjected to activation treatment. Thus, a carbon catalyst CA-IV, which was a carbonized material in a powder form having a carbon structure including iron, was obtained.

[Powder X-Ray Diffraction (Peak Separation)]

A sample of the carbon catalyst in a powder form was placed in a concave portion (2 cm×2 cm×0.5 mm in thickness) of a glass sample plate and pressed with a slide glass so as to be uniformly filled into the concave portion so that the surface of the sample was matched with a reference surface. Next, the glass sample plate was fixed onto a wide-angle X-ray diffraction sample stage so that the filled sample was not deformed.

Then, X-ray diffraction measurement (XRD) was performed through use of an X-ray diffractometer (Rigaku RINT2100/PC, manufactured by Rigaku Corporation). The voltage and current applied to an X-ray tube were 50 kV and 300 mA, respectively. The sampling interval was 0.1°, the scanning speed was 1°/min, and the measurement angle range (2θ) was from 5° to 90°. As an incident X-ray, CuKα was used. The sample thickness was set to 0.5 mm, and the divergence slit width β was set to ⅔°.

When the carbon catalyst has a laminated structure formed of a curved net surface which contributes to the catalytic activity of the carbon catalyst, a diffraction peak of a carbon (002) plane appears in the vicinity of a diffraction angle (2θ) of 26° (range of from 23° to 27°) in an X-ray diffraction pattern. In this peak, three kinds of peaks, one graphite structure peak ($f_{narrow}$) derived from a (002) plane of a graphite structure which is a high-crystalline component and two peaks ($f_{middle}$ and $f_{broad}$) derived from a low-crystalline component, are included.

In view of the foregoing, through the peak separation of X-ray diffraction data, the peak in the vicinity of 26° was separated into three peaks $f_{broad}$, $f_{middle}$ and $f_{narrow}$. The separation of the peak was performed by approximating the overlapping peaks by a superimposition of Gaussian basic waveforms. The fitting was performed by optimizing, as parameters, a peak intensity, a peak half width and a peak position of a Gauss function serving as each component, in the diffraction pattern which had been subjected to intensity correction and background correction described later.

The intensity correction was performed by dividing the diffraction intensity at each diffraction angle by an intensity correction coefficient. The intensity correction coefficient is represented by a product of a polarization factor (P), a Lorentz factor (L), and an atom scattering factor of carbon (fc). Herein, the factors are as follows: "polarization factor: $P=2+\cos^2 2\theta$", "Lorentz factor: $L=1/(\sin^2\theta \cdot \cos\theta)$", and "atom scattering factor of carbon: $fc=-117.37 \times s^6+411.32 \times s^5-535.68 \times s^4+304.55 \times s^3-55.82 \times s^2-11.943 \times s+6.0184$ (where $s=(\sin\theta)/1.54183$)". The background correction was performed by defining a straight line connecting an intensity in the vicinity of from 10° to 20° to an intensity in the vicinity of from 30° to 40° as a background, and subtracting the background from each diffraction intensity after the intensity correction. A ratio of each component was calculated based on an area of each peak obtained through the above-mentioned peak separation.

[X-Ray Photoelectron Spectroscopy]

Surface analysis of the carbon catalyst was performed by X-ray photoelectron spectroscopy (XPS) with an X-ray photoelectron spectrometer (AXIS Nova, manufactured by Kratos Analytical Ltd.) using an AlKα ray (output: 10 mA×15 kV) as an X-ray source. Specifically, surface elemental concentrations (%) of a carbon atom, a nitrogen atom, an oxygen atom, and a metal atom were determined based on the areas of the respective peaks in a spectrum obtained through XPS measurement and detection sensitivity coefficients. A value for a ratio (N/C ratio) of number of nitrogen atoms to number of carbon atoms on the surface of the carbon catalyst was calculated as a ratio of concentrations between these elements. A background at the time of quantitative calculation was determined by a Shirley method.

[Temperature Programmed Desorption Method (Carbon Catalyst)]

The carbon catalyst was placed in a temperature programmed desorption device (manufactured by BEL Japan, Inc.), and subjected to heat treatment under high vacuum to desorb a surface functional group of the carbon catalyst. Then, oxygen was adsorbed to the surface of the carbon catalyst, and the carbon catalyst was heated under a flow of a carrier gas (He) at 50 mL/min. The desorbed gas was measured with a quadrupole mass spectrometer (QMS).

Specifically, first, pretreatment (desorption of a catalyst surface functional group by heat treatment) of the carbon catalyst was performed. More specifically, 0.02 g of the carbon catalyst was filled into a center portion of a reaction tube made of quartz and set in a temperature programmed desorption device. The temperature of the inside of the device was increased to 50° C. at a temperature increase rate of 5° C./min and was kept at this temperature for 40 minutes, to thereby stabilize the device. After that, the carbon catalyst was subjected to heat treatment by heating to the temperature of at a temperature increase rate of 10° C./min, and thereby the functional group on the surface thereof was desorbed.

Next, oxygen was adsorbed to the surface of the carbon catalyst. Specifically, first, the inside of the device was kept at 150° C. for 10 minutes, to thereby stabilize the device. After that, the carbon catalyst which had been subjected to the heat treatment as described above was kept at 150° C. for 20 minutes under a flow of an oxygen ($O_2$) gas at 5 vol %, to thereby chemically adsorb oxygen to the surface (mainly, an edge surface) of the carbon catalyst.

Further, the carbon catalyst was subjected to heat treatment, and carbon monoxide (CO) and carbon dioxide ($CO_2$) that were desorbed were measured. Specifically, a helium (He) gas was allowed to flow in the device at 150° C. for 25 minutes, to thereby remove oxygen which had not been chemically adsorbed to the carbon catalyst. Next, the temperature of the inside of the device was increased again from 150° C. to 1,000° C. at a temperature increase rate of 10° C./min. During the increase in temperature, a helium (He) gas was allowed to flow in the device at 50 mL/min. Carbon monoxide and carbon dioxide generated by the desorption of an oxygen-containing compound were detected, and a correlation between the temperature (horizontal axis) and the detection intensity (vertical axis) was recorded.

Then, the amounts of the desorbed carbon monoxide and carbon dioxide were determined. Specifically, integral values of detection intensities (detection intensity areas) of carbon monoxide and carbon dioxide from 150° C. at which the heat treatment was started to a temperature (1,000° C. or 900° C.) at which quantification was intended to be performed were respectively calculated.

Meanwhile, a calibration curve representing a correlation between the desorption amounts of carbon monoxide and carbon dioxide and the detection intensity area was prepared through use of a predetermined amount of calcium oxalate monohydrate ($CaC_2O_4 \cdot H_2O$) as a reference material. Specifically, 0.02 g of a sample containing a mixture of alumina and calcium oxalate monohydrate ($CaC_2O_4 \cdot H_2O$) was subjected to heat treatment under the above-mentioned conditions so that the content of calcium oxalate reached 250 μmol, 500 μmol, 750 μmol, or 1,000 μmol, to thereby obtain a calibration curve. Then, the desorption amounts (release amounts) of carbon monoxide and carbon dioxide from the carbon catalyst were quantified based on the detection intensity area obtained by the measurement and the calibration curve.

In addition, the temperature at which the carbon dioxide desorption amount exhibited a maximum value in a TPD curve obtained by measuring the carbon dioxide desorption amount was determined as a peak top position (° C.).

[Carrying of Platinum Particles on Carbon Catalyst Particles (Production of Control Catalyst)]

The carbon catalyst CA-Ia was subjected to platinum carrying treatment using 2 wt % of platinum (Pt). Specifically, first, 0.055 g of a hexachloroplatinic (IV) acid hexahydrate ($H_2PtCl_6 \cdot 6H_2O$) (containing 0.021 g of platinum) was dissolved in 50 g of distilled water, to thereby prepare a platinum-containing solution. Next, 1 g of the carbon catalyst CA-Ia was added to the platinum-containing solution, and the resultant was refluxed at 100° C. for 3 hours. After that, the solid material was washed with distilled water and collected through suction filtration. Further, the solid material was subjected to vacuum drying and then reducing treatment at 650° C. in a hydrogen atmosphere, and thus a control catalyst Pt/CA-Ia formed of the carbon catalyst CA-Ia and platinum particles carried on the carbon catalyst CA-Ia was obtained.

In addition, a control catalyst Pt/CA-III formed of the carbon catalyst CA-III and platinum particles carried on the carbon catalyst CA-III was obtained in the same manner as in the production of the control catalyst Pt/CA-Ia except that the carbon catalyst CA-III was used instead of the carbon catalyst CA-Ia.

In addition, a control catalyst Pt/CA-IV formed of the carbon catalyst CA-IV and platinum particles carried on the carbon catalyst CA-IV was obtained in the same manner as in the production of the control catalyst Pt/CA-Ia except that the carbon catalyst CA-IV was used instead of the carbon catalyst CA-Ia.

[Production of Composition for Catalyst Layer]

0.2 g of the carbon catalyst produced as described above, platinum particles carried on a carbon carrier (Pt/C), 2.80 g of a 5 wt % NAFION™ solution (manufactured by Aldrich) serving as an electrolyte material, and 25 g of balls were loaded into a pot, and mixed with a ball mill at 200 rpm for 50 minutes. Thus, a composition for a catalyst layer in a slurry form in which the carbon catalyst, the Pt/C, and the electrolyte material were uniformly dispersed, was obtained.

The Pt/C used was a platinum-carrying carbon material which included Ketjen black in a powder form serving as a carbon carrier and platinum particles carried on the Ketjen black, and had a content of the platinum particles (amount of the platinum particles being carried) with respect to the entirety of the Pt/C of 20 wt % or 40 wt %.

In addition, as a control, 0.2 g of the control catalyst (Pt/CA-Ia, Pt/CA-III, or Pt/CA-Iv) produced as described above, 2.80 g of a 5 wt % NAFION™ solution (manufactured by Aldrich), and 25 g of balls were loaded into a pot, and mixed with a ball mill at 200 rpm for 50 minutes. Thus, a composition for a catalyst layer in a slurry form in which the control catalyst and the electrolyte material were uniformly dispersed, was obtained.

[Inductively Coupled Plasma Atomic Emission Spectroscopy]

In the composition for a catalyst layer produced as described above, a mass ratio of the content of platinum to the content of a metal other than platinum was measured.

Specifically, the content of a metal in the composition for a catalyst layer was measured by inductively coupled plasma (ICP) atomic emission spectroscopy. More specifically, first, 25 mg to 100 mg of the composition for a catalyst layer, which was a mixture of the carbon catalyst and the Pt/C, was weighed out, and components other than a metal component were completely incinerated in a maffle furnace. Next, a total of 5 mL of sulfuric acid and nitric acid were added to the composition after the incineration, to thereby thermally decompose the composition. After that, 45 mL of distilled water was added to the resultant, to thereby obtain a solution having a constant volume. Then, through use of the solution, the concentration of each metal in the composition for a catalyst layer was determined with an ICP atomic emission spectrometer (manufactured by Shimadzu Corporation, ICP-8100) based on a calibration curve, and the content of each metal was converted from the concentration. From the content of each metal thus obtained, a mass ratio of the content of platinum to the content of a metal other than platinum in the composition for a catalyst layer was calculated.

[Temperature Programmed Desorption Method (Composition for Catalyst Layer)]

The composition for a catalyst layer was subjected to a temperature programmed desorption method in the same manner as in the temperature programmed desorption method for the carbon catalyst described above except that the composition for a catalyst layer was used instead of the carbon catalyst.

[Powder X-Ray Diffractometry (Average Particle Diameter of Platinum Particles)]

With regard to the Pt/C used in the production of the composition for a catalyst layer described above, the average particle diameter of the platinum particles contained in the Pt/C was measured. Specifically, a sample of the Pt/C in a powder form was placed in a concave portion (2 cm×2 cm×0.5 mm in thickness) of a glass sample plate and pressed with a slide glass so as to be uniformly filled into the concave portion so that the surface of the sample was matched with a reference surface. Next, the glass sample plate was fixed onto a wide-angle X-ray diffraction sample stage so that the filled sample was not deformed.

Then, X-ray diffraction measurement (XRD) was performed using an X-ray diffractometer (Rigaku RINT2100/PC, manufactured by Rigaku Corporation). The voltage and current applied to an X-ray tube were 50 kV and 300 mA, respectively. The sampling interval was 0.1°, the scanning speed was 1°/min, and the measurement angle range ($2\theta$) was from 5° to 90°. As an incident X-ray, CuKα was used. The sample thickness was set to 0.5 mm, and the divergence slit width β was set to $\frac{2}{3}$°.

An X-ray diffraction pattern obtained through the measurement under the above-mentioned conditions was subjected to background correction. The background correction was performed by defining a straight line connecting an intensity of the vicinity of the diffraction angle of from 10° to 20° to an intensity of the vicinity of the diffraction angle of from 70° to 80° as a background, and subtracting the background from each diffraction intensity. In the corrected X-ray diffraction pattern, a value calculated from a peak (in the vicinity of $2\delta=46°$ derived from Pt (200) was inserted into the Scherrer equation, to thereby calculate the particle diameter of Pt.

The Scherrer equation is as follows: $D$ (nm)=$K\lambda/(B \cdot \cos \theta)$. In the Scherrer equation, "D" represents the particle diameter of platinum, "K" represents 0.94 (Scherrer constant), "B" represents a half width, "λ" represents a measurement X-ray wavelength (CuKα: 1.5418 Å), and "θ" represents the Bragg angle of a diffraction line.

When a peak derived from Pt (111) and the peak derived from Pt (200) overlapped with each other in the resultant X-ray diffraction pattern, peak separation was performed, and a value calculated from the peak derived from Pt (200) after the peak separation was inserted into the Scherrer equation, to thereby calculate the particle diameter of Pt.

The peak separation will be described in detail below. In the X-ray diffraction pattern having been subjected to the background correction, the peak separation was performed by: approximating a peak having a peak top in the vicinity of the diffraction angle 2θ of 40° (35° to 43°) with two superimposed Gaussian basic waveforms; optimizing a peak intensity, a peak half width and a peak position; and subjecting each peak to curve fitting. The curve fitting was performed so that a residual sum of squares became smallest. Herein, the residual square refers to a square of a residual error at each measured diffraction angle, and the residual sum of squares refers to a sum of residual squares. In addition, the residual error refers to a difference between the intensity of the peak in the corrected X-ray diffraction pattern and the sum of intensities of the two separated peaks. The peak separation was performed by the above-mentioned procedure, and thus the peak derived from Pt (200) was obtained.

[Electrochemical Active Surface Area of Platinum]

With regard to the Pt/C used in the production of the composition for a catalyst layer described above, the electrochemical active surface area (ECA) of the platinum particles contained in the Pt/C was measured. Specifically, the electrochemical active surface area (ECA) of the platinum particles was determined from an electric amount corresponding to a hydrogen adsorption amount in cyclic voltammetry. First, a current-voltage characteristic curve (voltammogram) was determined through use of a rotating disk electrode under the following conditions: electrolytic solution: 0.1 mol/L $HClO_4$ aqueous solution (saturated with a nitrogen gas), temperature: 25° C., counter electrode: platinum counter electrode (in a coil form), reference electrode: reversible hydrogen electrode, scanning range: 1.06 V to 0.06 V (vs. RHE), scanning speed: 50 mV/s, electrode diameter: 4 mm, and content of the Pt/C per unit area of an electrode: 0.1 mg/cm$^2$.

Specifically, first, a Pt/C slurry was prepared. 5 mg of the Pt/C, 50 µL of a 5 wt % NAFION™ solution (manufactured by Aldrich), 100 µL of isopropanol, and 400 µL of distilled water were mixed, and the mixture was subjected to ultrasonic treatment for 10 minutes and then treatment with a homogenizer for 2 minutes, to thereby prepare a Pt/C slurry in which the Pt/C was uniformly dispersed.

Next, 1.382 µL of the slurry was sucked up with a pipette, and applied onto a ring disk electrode (diameter: 4 mm) of a rotating ring disk electrode apparatus (RRDE-3A, manufactured by BAS Inc.), followed by drying. Thus, a working electrode was produced.

Then, cyclic voltammetry in which the Pt/C was used for the working electrode in a three-electrode system was performed. In the cyclic voltammetry, first, the electrolytic solution was saturated with nitrogen by being bubbled with nitrogen at 25° C. for 10 minutes, and then measurement was started. Specifically, through use of the electrolytic solution saturated with nitrogen, a cycle in which a potential was swept from 1.06 V (vs. RHE) to 0.06 V (vs. RHE) at a scanning speed of 50 mV/sec was performed at 25° C. without rotating the electrode, to thereby measure a value for a current passing through the working electrode.

The electric amount (Q) corresponding to a hydrogen adsorption amount was determined from the area of a peak portion of a response current at from 0.06 V/vs. NHE to 0.4 V/vs. NHE in the resultant voltammogram, and the electrochemical active surface area ECA (S) per 1 g of the platinum particles was calculated by the following equation using the electric amount and 2.1 (C/m$^2$-Pt): S=Q/2.1/weight of platinum (g).

[Production of Battery Electrode]

The composition for a catalyst layer in a slurry form produced as described above was applied onto a 3 cm square gas diffusion layer (manufactured by SGL carbon, "25BC") (5 cm$^2$) so that the content of the carbon catalyst per unit area of a battery electrode was 2.5 mg/cm$^2$ or 1.0 mg/cm$^2$, followed by drying, to thereby form a catalyst layer on the gas diffusion layer. Thus, a battery electrode, having formed therein the catalyst layer including the platinum particles carried on a carbon carrier and the carbon catalyst, was obtained.

[Condition of Catalyst Layer]

The condition of the catalyst layer (mainly, the degree of formation of cracks in the catalyst layer) produced as described above including the platinum particles carried on a carbon carrier and the carbon catalyst was visually evaluated.

[Durability Test]

The battery electrode produced as described above was subjected to a durability test. Specifically, the battery electrode produced as described above, including the catalyst layer (catalyst layer of a positive electrode) including the platinum particles each carried on a carbon carrier and the carbon catalyst, was used as a positive electrode.

Meanwhile, a negative electrode was produced as described below. 0.5 g of the Pt/C, 10 g of a 5 wt % NAFION™ solution (manufactured by Aldrich), 2 g of distilled water, and 10 g of balls were loaded into a pot, and mixed with a ball mill at 200 rpm for 10 minutes. Thus, a Pt/C composition in a slurry form was prepared. A negative electrode including a catalyst layer (catalyst layer of a negative electrode) formed of the Pt/C composition was produced in the same manner as in the case of the positive electrode, except that the Pt/C composition in a slurry form was applied onto a gas diffusion layer (5 cm$^2$) so that the application amount of the Pt/C per unit area of the electrode was 0.3 mg/cm$^2$.

Then, a polymer electrolyte membrane (manufactured by DuPont, "NAFION™ 112") was arranged between the catalyst layer of a positive electrode and the catalyst layer of a negative electrode, and the resultant was subjected to pressure bonding under the conditions of 150° C. and 1 MPa for 3 minutes, to thereby produce a MEA. Further, gaskets were attached to the MEA, and the resultant was sandwiched between separators, to thereby produce a single cell of a fuel cell.

After that, the single cell produced as described above was arranged in an automatic fuel cell evaluation system (manufactured by TOYO Corporation). A power generation test was performed by supplying, to the single cell, saturated humidified air (oxygen) at 160 mL/min to a positive electrode side and saturated humidified hydrogen at 450 mL/min to a negative electrode side at a back pressure of 70 kPa, and setting the temperature of the cell to 75° C. After that, a current hold test (durability test) was performed.

Specifically, the power generation test was performed by measuring an open circuit voltage for 5 minutes, and then measuring a current density while holding a current density of the cell within the range of from 0 A/cm$^2$ to 3 A/cm$^2$ in increments of 0.02 A/cm$^2$ for 5 seconds each.

Specifically, the current hold test (durability test) was performed by supplying a fuel (saturated humidified hydrogen) to the negative electrode and saturated humidified air to the positive electrode, and maintaining a constant current density of 0.5 A/cm$^2$ for 100 hours. Thus, the durability of the battery can be evaluated.

After lapse of 100 hours from the start of the current hold test, the power generation test was performed again. The durability was evaluated by comparing potentials observed at 0.2 A/cm$^2$ in the power generation test before and after the current hold test.

[Transmission Electron Microscope]

The carbon catalyst, the Pt/carrier, and the catalyst layer each produced as described above were partially observed with a transmission electron microscope (TEM).

[Results]

The characteristics of the carbon catalysts (in Example C1, Ketjen black (KB) was used instead of the carbon catalyst) and the Pt/carriers (in each of Example C8 to Example C10, the control catalyst (Pt/CA-Ia, Pt/CA-III, or Pt/CA-IV) was used as the Pt/carrier instead of the Pt/C without using the carbon catalyst not carrying Pt, and in other examples, the Pt/C was used as the Pt/carrier) used in Example C1 to Example C10 and Example 1 to Example 39 are shown in FIG. 1A. Specifically, with regard to each of the carbon catalysts, the name of the sample, the area ratios (%) of three kinds of peaks ($f_{broad}$, $f_{middle}$ and $f_{narrow}$) obtained through XRD peak separation, the N/C ratio (-)

obtained by XPS, and the CO desorption amount (mmol/g) and the $CO_2$ desorption amount (mmol/g) in a temperature programmed desorption method (TPD) are shown in FIG. 1A, and with regard to each of the Pt/carriers, the content ratio (wt %) of platinum (Pt) with respect to the entirety of the Pt/carrier, the electrochemical active surface area (ECA) ($m^2$/g) of Pt contained in the Pt/carrier, and the average particle diameter (nm) of Pt contained in the Pt/carrier are shown in FIG. 1A.

The characteristics of the compositions for a catalyst layer and the battery electrodes produced in Example C1 to Example C10 and Example 1 to Example 39 are shown in FIG. 1B. Specifically, with regard to each of the compositions for a catalyst layer, the mass ratio (-) of the content of platinum to the content of a metal other than platinum obtained by ICP atomic emission spectroscopy, and the CO desorption amount and the $CO_2$ desorption amount (mmol/g) obtained by TPD are shown in FIG. 1B, and with regard to each of the battery electrodes, the content (mg/$cm^2$) of Pt, the content (mg/$cm^2$) of the Pt/carrier, and the content (mg/$cm^2$) of the carbon catalyst per unit area of the battery electrode, the condition of the catalyst layer, and in the durability test, voltages (mV) at a current of 0.2 A/$cm^2$ before and after the test and a difference (mV) between the voltages before and after the test, are shown in FIG. 1B.

With regard to the condition of the catalyst layer shown in FIG. 1B, a circle mark indicates that no notable cracks were formed in the catalyst layer, a triangle mark indicates that cracks were formed in part of the catalyst layer, and a cross mark indicates that many cracks or large cracks were formed in the catalyst layer.

The results of the XRD peak separation of the carbon catalyst CA-Ia, the carbon catalyst CA-III, the carbon catalyst CA-IV, and Ketjen black are shown in FIG. 2A, FIG. 2B, FIG. 2C, and FIG. 2D, respectively. As shown in FIG. 2A, FIG. 2B, FIG. 2C, and FIG. 2D, three peaks $f_{broad}$, $f_{middle}$ and $f_{narrow}$ were obtained through the peak separation.

As shown in FIG. 1A and FIG. 1B, in Example C1, in which Ketjen black was used instead of the carbon catalyst, in Example C2 to Example C5, in each of which the content of Pt per unit area of the electrode was 0.0006 mg/$cm^2$ or less, and in Example C8 to Example C10, in each of which the control catalyst was used instead of the carbon catalyst and Pt not carried on the carbon catalyst, the difference between the voltages before and after the durability test was large. That is, in Example C1 to Example C5 and Example C8 to Example C10, deterioration of the battery electrode in the durability test was remarkable.

In addition, in Example C6 and Example C7, in each of which the content of Pt per unit area of the electrode was 0.1500 mg/$cm^2$ or more, many cracks or large cracks were formed in the catalyst layer. That is, in Example C6 and Example C7, it was difficult to form a uniform catalyst layer in which no cracks were formed.

In contrast, in Example 1 to Example 39, in each of which the content of Pt per unit area of the electrode was 0.0010 mg/$cm^2$ or more and 0.1200 mg/$cm^2$ or less, deterioration in the durability test was suppressed, and many cracks or large cracks were not formed in the catalyst layer.

The area ratios of $f_{broad}$, $f_{middle}$ and $f_{narrow}$ obtained through the XRD peak separation of the carbon catalyst used in each of Example 1 to Example 39 were 63.6% or more and 94.9% or less, 4.0% or more and 30.3% or less, and 1.1% or more and 14.0% or less, respectively.

In addition, the N/C ratio of the carbon catalyst used in each of Example 1 to Example 39 was 0.005 or more. The CO desorption amount and the $CO_2$ desorption amount of the carbon catalyst used in each of Example 1 to Example 39 in TPD were 0.270 mmol/g or more and 0.060 mmol/g or more, respectively. The average particle diameter of Pt used in each of Example 1 to Example 39 was 1.9 nm or more and 29.4 nm or less. The ECA of the Pt/C used in each of Example 1 to Example 39 was 9.5 $m^2$/g or more.

In addition, the mass ratio of the content of Pt to the content of a metal other than Pt in the composition for a catalyst layer used in each of Example 1 to Example 39 was 0.08 or more and 19.67 or less. The CO desorption amount and the $CO_2$ desorption amount of the composition for a catalyst layer used in each of Example 1 to Example 39 were 0.151 mmol/g or more and 0.034 mmol/g or more, respectively. The content of the Pt/carrier per unit area of the electrode of each of Example 1 to Example 39 was 0.0050 mg/$cm^2$ or more and 0.6000 mg/$cm^2$ or less.

In addition, in Example 1 to Example 35, in each of which the content of Pt per unit area of the electrode was 0.0010 mg/$cm^2$ or more and 0.0500 mg/$cm^2$ or less, cracks were not formed in the catalyst layer, and a uniform catalyst layer was formed. The mass ratio of the content of Pt to the content of a metal other than Pt in the composition for a catalyst layer used in each of Example 1 to Example 35 was 0.08 or more and 8.31 or less.

In addition, in Example 1 to Example 31, in each of which the average particle diameter of Pt was less than 27.3 nm (specifically, 25.0 nm or less), the difference between the voltages before and after the durability test was less than 90 mV (specifically, 87 mV or less), and the durability of the battery electrode was excellent compared to Example 32 and Example 33. Accordingly, the fact that the average particle diameter of Pt was 27.0 nm or less was considered to contribute to an improvement in durability of the battery electrode including Pt. The ECA of the Pt/C used in each of Example 1 to Example 31 was 11.2 $m^2$/g or more.

In addition, in Example 1 to Example 29, in each of which the average particle diameter of Pt was less than 17.5 nm (specifically, 15.0 nm or less), the difference between the voltages before and after the durability test was less than 80 mV (specifically, 77 mV or less), and the durability of the battery electrode was excellent compared to Example 30 and Example 31. Accordingly, the fact that the average particle diameter of Pt was 17.0 nm or less was considered to contribute to an improvement in durability of the battery electrode including Pt. The ECA of the Pt/C used in each of Example 1 to Example 29 was 25.7 $m^2$/g or more.

In addition, in Example 1 to Example 28, in each of which the average particle diameter of Pt was less than 15.0 nm (specifically, 9.2 nm or less), the difference between the voltages before and after the durability test was less than 50 mV (specifically, 41 mV or less) and the durability of the battery electrode was extremely good compared to other Examples. Accordingly, the fact that the average particle diameter of Pt was less than 15.0 nm (e.g., 14.0 nm or less) was considered to contribute significantly to an improvement in durability of the battery electrode including Pt. The ECA of the Pt/C used in each of Example 1 to Example 28 was 56.2 $m^2$/g or more.

Further, in Example 1 to Example 28, in each of which the average particle diameter of Pt was less than 15.0 nm (e.g., 14.0 nm or less), and the area ratios of $f_{broad}$, $f_{middle}$ and $f_{narrow}$ obtained through the XRD peak separation of the used carbon catalyst were 76.2% or more and 94.9% or less, 4.0% or more and 14.9% or less, and 1.1% or more and 9.7% or less, respectively, the difference between the voltages before and after the durability test was less than 50 mV (specifically, 41 mV or less), and the durability of the battery electrode was extremely good compared to Example 29 to Example 35.

Accordingly, for example, the use of the carbon catalyst having a carbon structure in which the area ratios of $f_{broad}$, $f_{middle}$ and $f_{narrow}$ obtained by XRD were 70.0% or more and 96.0% or less, 3.5% or more and 20.0% or less, and 0.4% or more and 13.0% or less, respectively, was considered to contribute to an improvement in durability of the battery electrode.

In addition, the N/C ratio of the carbon catalyst used in each of Example 1 to Example 28 was 0.010 or more. The CO desorption amount and the $CO_2$ desorption amount of the carbon catalyst used in each of Example 1 to Example 28 in TPD were 0.340 mmol/g or more and 0.110 mmol/g or more, respectively. The CO desorption amount and the $CO_2$ desorption amount of the composition for a catalyst layer used in each of Example 1 to Example 28 in TPD were 0.190 mmol/g or more and 0.062 mmol/g or more, respectively.

Images of the carbon catalyst CA-Ia, the Pt/C, the control catalyst Pt/CA-Ia, and a mixture of the carbon catalyst CA-Ia and the Pt/C obtained through observation with TEM are shown in FIG. 3A, FIG. 3B, FIG. 3C, and FIG. 3D, respectively. A scale bar in each of the TEM images represents a length of 20 nm.

Figure 3C:
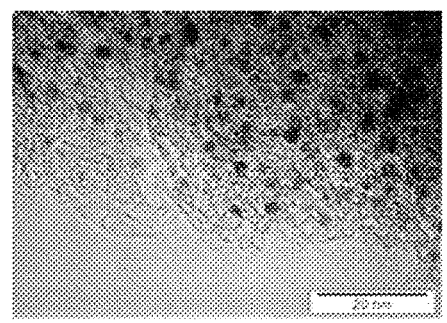
FIG. 3C is an explanatory view for showing an example of a transmission electron micrograph of platinum particles, each carried on the carbon catalyst CA-Ia, used in an Example according to the embodiment of the present invention.

As shown in FIG. 3C, in the control catalyst Pt/CA-Ia formed of the carbon catalyst CA-Ia and platinum particles carried on the carbon catalyst CA-Ia, the platinum particles were uniformly dispersed.

Figure 3D:
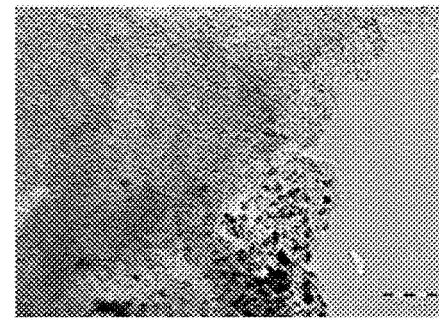
FIG. 3D is an explanatory view for showing an example of a transmission electron micrograph of platinum particles carried on carbon carrier particles mixed with the carbon catalyst CA-Ia used in an Example according to the embodiment of the present invention.

In contrast, as shown in FIG. 3D, in the mixture of the carbon catalyst CA-Ia (FIG. 3A) and the Pt/C (FIG. 3B) formed of carbon carrier particles other than the carbon catalyst CA-Ia and platinum particles carried on the carbon carrier particles, the Pt/C forms secondary particles, and as a result, the platinum particles contained in the Pt/C were unevenly dispersed without being uniformly dispersed. That is, in the TEM image of FIG. 3D, a state in which the carbon catalyst CA-Ia not carrying the platinum particles and the Pt/C forming secondary particles were separated from each other was observed. As described above, the mixture of the carbon catalyst CA-Ia and the Pt/C was clearly distinguished from the control catalyst Pt/CA-Ia.

The invention claimed is:

1. A battery electrode, comprising a catalyst layer containing a carbon catalyst and platinum particles not being carried on the carbon catalyst,
    wherein the carbon catalyst is a nitrogen-containing carbon catalyst,
    wherein the platinum particles are carried on carrier particles other than the carbon catalyst, and
    wherein a content of the platinum particles per unit area of the battery electrode is 0.0010 mg/cm$^2$ or more and 0.1200 mg/cm$^2$ or less.

2. The battery electrode according to claim 1, wherein the platinum particles have an average particle diameter of 30.0 nm or less.

3. The battery electrode according to claim 1, wherein the nitrogen-containing carbon catalyst has, on a surface thereof, a ratio of number of nitrogen atoms to number of carbon atoms of 0.001 or more and 0.600 or less.

4. The battery electrode according to claim 1, wherein the carbon catalyst contains a metal other than platinum.

5. The battery electrode according to claim 4, wherein the battery electrode has a mass ratio of a content of the platinum to a content of the metal other than platinum of 0.04 or more and 20.00 or less.

6. The battery electrode according to claim 1, wherein the carbon catalyst has a carbon structure in which area ratios of three peaks $f_{broad}$, $f_{middle}$ and $f_{narrow}$ obtained by separating a peak having a peak top in a vicinity of a diffraction angle of 26° in an X-ray diffraction pattern obtained by powder X-ray diffraction satisfy the following conditions (a) to (c):
    (a) $f_{broad}$: 60.0% or more and 96.0% or less;
    (b) $f_{middle}$: 3.5% or more and 32.0% or less; and
    (c) $f_{narrow}$: 0.4% or more and 15.0% or less.

7. The battery electrode according to carbon 1, wherein the carbon catalyst has a carbon structure which exhibits a carbon monoxide desorption amount at from 150° C. to 1,000° C. of 0.250 mmol/g or more and a carbon dioxide desorption amount at from 150° C. to 900° C. of 0.040 mmol/g or more in a temperature programmed desorption method including measuring desorption amounts of carbon monoxide and carbon dioxide at from 0° C. to 1,000° C.

8. A composition for a catalyst layer of a battery electrode, wherein:
    the composition comprises a carbon catalyst and platinum particles not being carried on the carbon catalyst;
    wherein the carbon catalyst is a nitrogen-containing carbon catalyst,
    the platinum particles are carried on carrier particles other than the carbon catalyst; and
    the composition is used for forming the catalyst layer so that a content of the platinum particles per unit area of the battery electrode is from 0.0010 mg/cm$^2$ or more and 0.1200 mg/cm$^2$ or less.

9. The composition for a catalyst layer of a battery electrode according to claim 8,
    wherein the composition has a carbon monoxide desorption amount at from 150° C. to 1,000° C. of 0.150 mmol/g or more and a carbon dioxide desorption amount at from 150° C. to 900° C. of 0.030 mmol/g or more in a temperature programmed desorption method including measuring desorption amounts of carbon monoxide and carbon dioxide at from 0° C. to 1,000° C.

10. The composition for a catalyst layer of a battery electrode according to claim 8, wherein the carbon catalyst contains a metal other than platinum.

11. The composition for a catalyst layer of a battery electrode according to claim 10, wherein the composition has a mass ratio of a content of the platinum to a content of the metal other than platinum of 0.04 or more and 20.00 or less.

12. A battery, comprising the battery electrode of claim 1.

13. The battery according to claim 12, wherein the battery is a fuel cell.

14. The battery electrode according to claim 1, wherein the carrier particles are one or more selected from a group consisting of carbon carrier particles, ceramic carrier particles, titanium oxide carrier particles, tin oxide carrier particles, carrier particles of tin oxide doped with niobium, and carrier particles of tin oxide doped with antimony.

15. The battery electrode according to claim 1, wherein the carrier particles include carbon carrier particles formed of one or more carbon materials selected from a group consisting of a carbon black, a carbon nanotube, a carbon fiber, graphite, graphite oxide, graphene, and activated carbon.

16. The composition for a catalyst layer of a battery electrode according to claim 8, wherein the carrier particles are one or more selected from a group consisting of carbon carrier particles, ceramic carrier particles, titanium oxide carrier particles, tin oxide carrier particles, carrier particles of tin oxide doped with niobium, and carrier particles of tin oxide doped with antimony.

17. The composition for a catalyst layer of a battery electrode according to claim 8, wherein the carrier particles include carbon carrier particles formed of one or more carbon materials selected from a group consisting of a carbon black, a carbon nanotube, a carbon fiber, graphite, graphite oxide, graphene, and activated carbon.

18. A battery electrode, comprising a catalyst layer containing a carbon catalyst and platinum particles not being carried on the carbon catalyst,
   wherein the carbon catalyst has a carbon structure in which area ratios of three peaks $f_{broad}$, $f_{middle}$ and $f_{narrow}$ obtained by separating a peak having a peak top in a vicinity of a diffraction angle of 26° in an X-ray diffraction pattern obtained by powder X-ray diffraction satisfy the following conditions (a) to (c):
   (a) $f_{broad}$: 60.0% or more and 96.0% or less;
   (b) $f_{middle}$: 3.5% or more and 32.0% or less; and
   (C) $f_{narrow}$: 0.4% or more and 15.0% or less,
   wherein the platinum particles are carried on carrier particles other than the carbon catalyst, and
   wherein a content of the platinum particles per unit area of the battery electrode is 0.0010 mg/cm$^2$ or more and 0.1200 mg/cm$^2$ or less.

19. A battery, comprising the battery electrode of claim 18.

* * * * *